United States Patent
Besehanic

(10) Patent No.: US 10,855,735 B2
(45) Date of Patent: *Dec. 1, 2020

(54) USING MESSAGING ASSOCIATED WITH ADAPTIVE BITRATE STREAMING TO PERFORM MEDIA MONITORING FOR MOBILE PLATFORMS

(71) Applicant: The Nielsen Company (US), LLC, New York, NY (US)

(72) Inventor: Jan Besehanic, Tampa, FL (US)

(73) Assignee: The Nielsen Company (US), LLC, New York, NY (US)

(*) Notice: Subject to any disclaimer, the term of this patent is extended or adjusted under 35 U.S.C. 154(b) by 0 days.

This patent is subject to a terminal disclaimer.

(21) Appl. No.: 16/457,440

(22) Filed: Jun. 28, 2019

(65) Prior Publication Data

US 2019/0327282 A1 Oct. 24, 2019

Related U.S. Application Data

(63) Continuation of application No. 15/920,053, filed on Mar. 13, 2018, now Pat. No. 10,341,401, which is a
(Continued)

(51) Int. Cl.
*H04L 29/06* (2006.01)
*G06Q 30/02* (2012.01)
(Continued)

(52) U.S. Cl.
CPC ......... *H04L 65/4084* (2013.01); *G06Q 30/02* (2013.01); *H04L 65/602* (2013.01);
(Continued)

(58) Field of Classification Search
CPC ... H04L 65/4084; H04L 65/80; H04L 65/608; H04L 65/602; H04L 29/06;
(Continued)

(56) References Cited

U.S. PATENT DOCUMENTS

| | | |
|---|---|---|
| 5,481,294 A | 1/1996 | Thomas et al. |
| 6,115,680 A | 9/2000 | Coffee et al. |

(Continued)

FOREIGN PATENT DOCUMENTS

| | | |
|---|---|---|
| AU | 2013205736 | 5/2013 |
| CN | 102917003 | 2/2013 |

(Continued)

OTHER PUBLICATIONS

China National Intellectual Property Administration, "Office Action," mailed in connection with Chinese Patent Application No. 201480081569.3, dated Jul. 2, 2019, 18 pages.

(Continued)

*Primary Examiner* — Brian J. Gillis
*Assistant Examiner* — Javier O Guzman
(74) *Attorney, Agent, or Firm* — Hanley, Flight & Zimmerman, LLC

(57) ABSTRACT

Example media monitoring apparatus disclosed herein include means for accessing, at a first server, a first adaptive bitrate streaming URL collected by a meter executing on a mobile platform, the first adaptive bitrate streaming URL collected from a first message to be sent by the mobile platform to a second server to stream first media according to an adaptive bitrate streaming protocol, the first adaptive bitrate streaming URL received at the first server in a report sent from the meter executing on the mobile platform. Disclosed example apparatus also include means for requesting network log information corresponding to the first adaptive bitrate streaming URL from a service provider providing network access for the mobile platform. Disclosed example apparatus further include means for monitoring presentation of the first media on the mobile platform using the network log information.

20 Claims, 12 Drawing Sheets

Related U.S. Application Data continuation of application No. 14/473,592, filed on Aug. 29, 2014, now Pat. No. 9,923,942.

(51) Int. Cl.
  *H04N 21/24* (2011.01)
  *H04N 21/442* (2011.01)
  *H04N 21/466* (2011.01)
  *H04N 21/845* (2011.01)

(52) U.S. Cl.
  CPC ............ *H04L 65/608* (2013.01); *H04L 65/80* (2013.01); *H04N 21/2402* (2013.01); *H04N 21/44204* (2013.01); *H04N 21/4667* (2013.01); *H04N 21/8456* (2013.01)

(58) Field of Classification Search
  CPC ............ H04L 43/0888; H04L 41/0293; H04N 21/8456; H04N 21/4667; H04N 21/44204; H04N 21/2402; G06Q 30/02
  See application file for complete search history.

(56) References Cited

U.S. PATENT DOCUMENTS

| | | | |
|---|---|---|---|
| 6,606,657 B1 | 8/2003 | Zilberstein et al. | |
| 6,968,380 B1 | 11/2005 | Singhal et al. | |
| 7,243,129 B1 | 7/2007 | Thomas | |
| 7,373,415 B1 | 5/2008 | DeShan et al. | |
| 7,398,271 B1 | 7/2008 | Borkovsky et al. | |
| 7,895,445 B1* | 2/2011 | Albanese | G06F 21/335 713/172 |
| 7,987,285 B2 | 7/2011 | Melnyk et al. | |
| 8,516,144 B2 | 8/2013 | Hsu | |
| 8,676,952 B2 | 3/2014 | Reynolds et al. | |
| 8,751,461 B2 | 6/2014 | Abraham et al. | |
| 9,479,805 B2* | 10/2016 | Rothschild | H04N 21/26613 |
| 9,635,404 B2 | 4/2017 | McMillan | |
| 2002/0021665 A1 | 2/2002 | Bhagavath et al. | |
| 2002/0053078 A1 | 5/2002 | Holtz et al. | |
| 2005/0213511 A1 | 9/2005 | Reece, Jr. et al. | |
| 2006/0200671 A1 | 9/2006 | Ishigaki et al. | |
| 2007/0157262 A1 | 7/2007 | Ramaswamy et al. | |
| 2008/0320508 A1 | 12/2008 | Ramswamy et al. | |
| 2009/0043906 A1 | 2/2009 | Hurst et al. | |
| 2009/0138447 A1 | 5/2009 | Kalavade | |
| 2009/0305680 A1* | 12/2009 | Swift | H04L 43/00 455/414.1 |
| 2010/0015926 A1 | 1/2010 | Luff | |
| 2010/0161492 A1* | 6/2010 | Harvey | G06Q 10/0639 705/50 |
| 2010/0174608 A1 | 7/2010 | Harkness et al. | |
| 2010/0205037 A1* | 8/2010 | Besehanic | G06Q 30/02 705/7.34 |
| 2010/0268573 A1 | 10/2010 | Jain et al. | |
| 2011/0082946 A1* | 4/2011 | Gopalakrishnan | H04L 65/4084 709/231 |
| 2011/0088052 A1 | 4/2011 | Ramaswamy et al. | |
| 2011/0093605 A1 | 4/2011 | Choudhury et al. | |
| 2011/0161485 A1 | 6/2011 | George et al. | |
| 2012/0117225 A1* | 5/2012 | Kordasiewicz | H04L 65/1083 709/224 |
| 2012/0158954 A1* | 6/2012 | Heffernan | H04L 67/42 709/224 |
| 2012/0215621 A1* | 8/2012 | Heffernan | G06Q 30/02 705/14.41 |
| 2012/0323675 A1* | 12/2012 | Paparo | G06Q 30/0243 705/14.42 |
| 2013/0005296 A1* | 1/2013 | Papakostas | H04W 24/00 455/405 |
| 2013/0007298 A1* | 1/2013 | Ramaswamy | H04N 21/2353 709/231 |
| 2013/0036435 A1 | 2/2013 | Hannan et al. | |
| 2013/0080772 A1* | 3/2013 | McGowan | H04L 63/0428 713/165 |
| 2013/0097220 A1 | 4/2013 | Lyons et al. | |
| 2013/0117418 A1* | 5/2013 | Mutton | H04N 21/23430 709/219 |
| 2013/0145022 A1* | 6/2013 | Srivastava | G06Q 30/0241 709/224 |
| 2013/0166690 A1* | 6/2013 | Shatzkamer | H04N 21/25891 709/219 |
| 2013/0198125 A1* | 8/2013 | Oliver | G06N 5/02 706/46 |
| 2013/0282898 A1 | 10/2013 | Kalus et al. | |
| 2013/0311780 A1 | 11/2013 | Besehanic | |
| 2014/0019587 A1* | 1/2014 | Giladi | H04L 29/06476 709/217 |
| 2014/0059156 A1 | 2/2014 | Freeman, II et al. | |
| 2014/0082220 A1 | 3/2014 | Ramaswamy et al. | |
| 2014/0122703 A1 | 5/2014 | Pugh et al. | |
| 2014/0137162 A1* | 5/2014 | McNamee | H04N 21/2187 725/63 |
| 2014/0140417 A1 | 5/2014 | Shaffer et al. | |
| 2014/0149577 A1 | 5/2014 | Monighetti | |
| 2014/0201335 A1 | 7/2014 | Wang | |
| 2014/0208341 A1 | 7/2014 | Ramaswamy et al. | |
| 2014/0244828 A1 | 8/2014 | Besehanic | |
| 2015/0350205 A1* | 12/2015 | Oyman | H04L 67/02 726/7 |
| 2016/0065635 A1* | 3/2016 | Besehanic | H04N 21/4667 709/224 |
| 2018/0205775 A1* | 7/2018 | Besehanic | H04N 21/4667 |

FOREIGN PATENT DOCUMENTS

| | | |
|---|---|---|
| CN | 103119565 | 5/2013 |
| JP | 2003281179 | 10/2003 |
| JP | 2007265053 | 10/2007 |
| WO | 0219625 | 3/2002 |
| WO | 2014117251 | 8/2014 |
| WO | 2016032554 | 3/2016 |

OTHER PUBLICATIONS

Japanese Patent Office, "Notice of Allowance," mailed in connection with Japanese Patent Application No. 2018-079928, dated Aug. 27, 2019, 3 pages.

European Patent Office, "European Search Report," mailed in connection with European Patent Application No. 14900595.1, dated Dec. 8, 2017, 8 pages.

Canadian Intellectual Property Office, "Office Action," mailed in connection with Canadian Patent Application No. 2,959,487, dated Dec. 19, 2017, 4 pages.

IP Australia, "Examination Report," mailed in connection with Australian Patent Application No. 2014404320, dated Oct. 30, 2017, 4 pages.

International Bureau, "International Preliminary Report on Patentability," mailed in connection with International Patent Application No. PCT/US2014/068200, dated Mar. 9, 2017.

International Searching Authority, "International Search Report and Written Opinion," mailed in connection with International Patent Application No. PCT/US2014/068200, dated May 18, 2015, 13 pages.

Wikipedia, "Adaptive Bitrate Streaming," accessed at http://en.wikipedia.org/wiki/Adaptive_Bitrate_Streaming.com, last modified Jun. 4, 2014, 5 pages.

Wikipedia, "HTTP Live Streaming," accessed at http://en.wikipedia.org/wiki/HTTP_Live_Streaming.com, last modified Jul. 19, 2014, 9 pages.

CNET News, "Verizon draws tire for monitoring app usage, browsing habits," accessed at http://www.news.cnet.com/8301-13578_3-57533001-38/verizon-draws-fire-for-monitoring-app-usage-browsing-habits/, dated Oct. 16, 2012, 5 pages.

United States Patent and Trademark Office, "Notice of Allowability," mailed in connection with U.S. Appl. No. 14/473,592, dated Jan. 25, 2018, 2 pages.

(56) References Cited

OTHER PUBLICATIONS

United States Patent and Trademark Office, "Notice of Allowance," mailed in connection with U.S. Appl. No. 14/473,592, dated Nov. 7, 2017, 8 pages.
United States Patent and Trademark Office, "Non-final Office Action" mailed in connection with U.S. Appl. No. 14/473,592, dated Mar. 27, 2017, 15 pages.
United States Patent and Trademark Office, "Final Office Action" mailed in connection with U.S. Appl. No. 14/473,592, dated Nov. 10, 2016, 12 pages.
United States Patent and Trademark Office, "Non-final Office Action" mailed in connection with U.S. Appl. No. 14/473,592, dated Apr. 14, 2016, 13 pages.
Japanese Patent Office, "Notice of Allowance," mailed in connection with Japanese Patent Application No. 2017-510505, dated Mar. 20, 2018, 3 pages.
IP Australia, "Examination Report No. 2," mailed in connection with Australian Patent Application No. 2014404320, dated Jul. 23, 2018, 2 pages.
Korean Intellectual Property Office, "Notice of Preliminary Rejection," mailed in connection with Korean Patent Application No. 10-2017-7007718, dated Oct. 19, 2018, 12 pages.
Canadian Intellectual Property Office, "Office Action," mailed in connection with Canadian Patent Application No. 2,959,487, dated Dec. 5, 2018, 4 pages.
United States Patent and Trademark Office, "Notice of Allowance" mailed in connection with U.S. Appl. No. 15/920,053, dated Feb. 14, 2019, 8 pages.
United States Patent and Trademark Office, "Non-final Office Action" mailed in connection with U.S. Appl. No. 15/920,053, dated Jun. 12, 2018, 21 pages.
IP Australia, "Examination Report No. 1," mailed in connection with Australian Patent Application No. 2019200652, dated Aug. 19, 2019, 2 pages.
Korean Intellectual Property Office, Notice of Preliminary Rejection, mailed in connection with Korean Patent Application No. 10-2019-7016841, dated Oct. 8, 2019, 5 pages.
Korean Intellectual Property Office, "Notice of Allowance," mailed in connection with Korean Patent Application No. 10-2019-7016841, dated Dec. 12, 2019, 3 pages.
European Patent Office, "Communication Pursuant to Article 94(3) EPC," mailed in connection with European Patent Application No. 14900595.1, dated Mar. 13, 2020, 6 pages.
China National Intellectual Property Office, "Notice of Decision of Granting Patent Right for Invention," mailed in connection with Chinese Patent Application No. 201480081569.3, dated Jun. 29, 2020, 7 pages.

* cited by examiner

USING MESSAGING ASSOCIATED WITH ADAPTIVE BITRATE STREAMING TO PERFORM MEDIA MONITORING FOR MOBILE PLATFORMS

RELATED APPLICATION(S)

This patent arises from a continuation of U.S. patent application Ser. No. 15/920,053 (now U.S. patent Ser. No. Ser. No. 10/341,401), which is entitled "USING MESSAGING ASSOCIATED WITH ADAPTIVE BITRATE STREAMING TO PERFORM MEDIA MONITORING FOR MOBILE PLATFORMS," and which was filed on Mar. 13, 2018, which is a continuation of U.S. patent application Ser. No. 14/473,592 (now U.S. Pat. No. 9,923,942), which is entitled "USING MESSAGING ASSOCIATED WITH ADAPTIVE BITRATE STREAMING TO PERFORM MEDIA MONITORING FOR MOBILE PLATFORMS," and which was filed on Aug. 29, 2014. Priority to U.S. patent application Ser. No. 14/473,592 and U.S. patent application Ser. No. 15/920,053 is hereby expressly claimed. U.S. patent application Ser. No. 14/473,592 and U.S. patent application Ser. No. 15/920,053 are hereby incorporated by reference in their respective entireties.

FIELD OF THE DISCLOSURE

This disclosure relates generally to media monitoring and, more particularly, to using messaging associated with adaptive bitrate streaming to perform media monitoring for mobile platforms.

BACKGROUND

The use of mobile platforms, such as smartphones, tablet computers, notebook computers, etc., to present media, such as media content, media advertisements, etc., has become commonplace. Accordingly, enhancing audience measurement campaigns to include monitoring of media impressions, such as impressions related to presentations of media content, media advertisements, etc., on mobile platforms can be valuable to content providers, advertisers, etc. To increase the value of the audience ratings data obtained from such audience measurement campaigns, audience measurement entities endeavor to augment media impression data with demographic information concerning the audience of the media impressions. Prior audience measurement techniques typically rely on monitoring statistically selected panels of audience members to obtain the demographic information for inclusion in the audience ratings data.

BRIEF DESCRIPTION OF THE DRAWINGS

Wherever possible, the same reference numbers will be used throughout the drawing(s) and accompanying written description to refer to the same or like parts, elements, etc.

DETAILED DESCRIPTION

Figure 1:
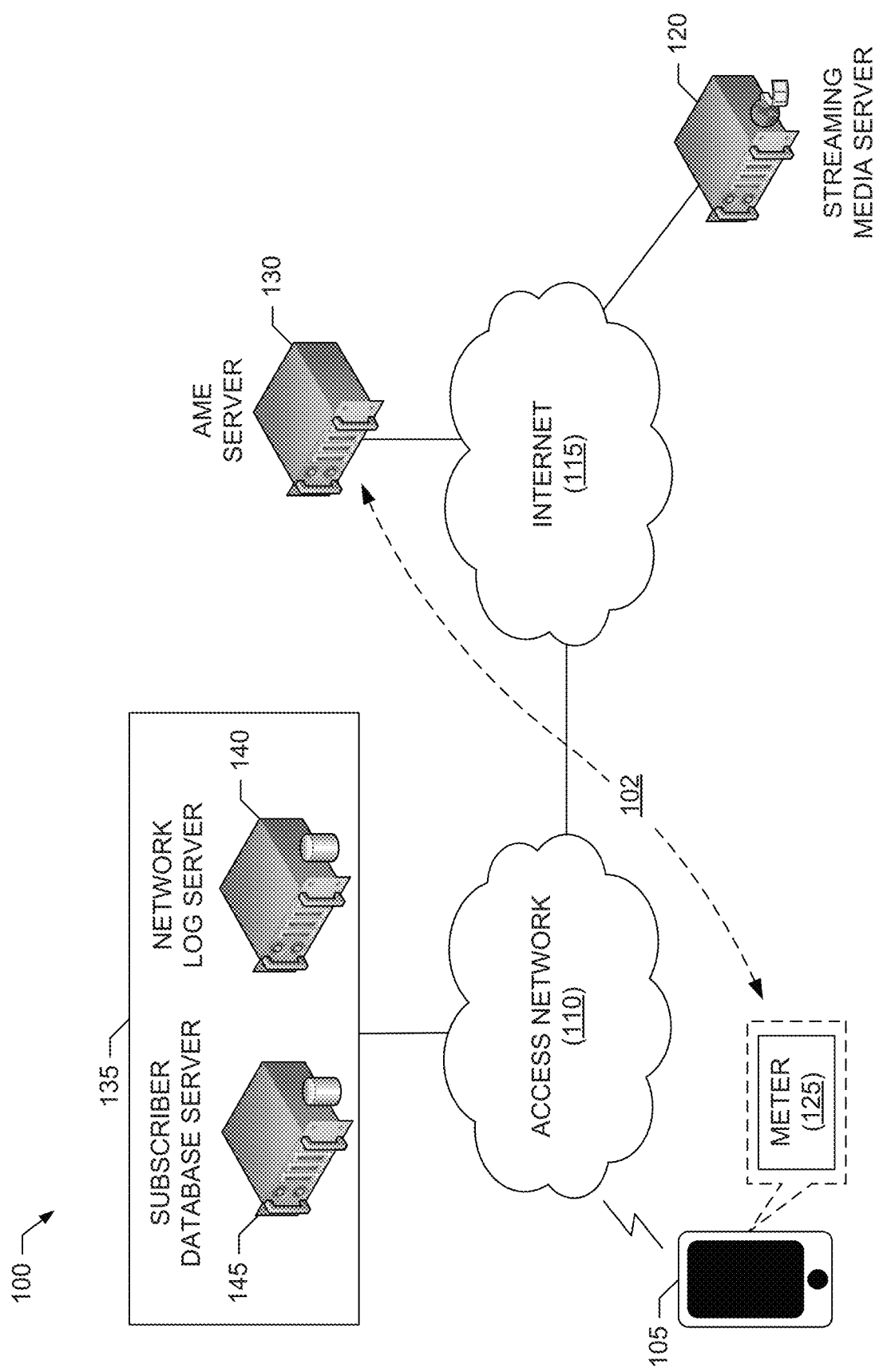
FIG. 1 is a block diagram of a first example environment of use including a first example audience measurement system to perform media monitoring for mobile platforms using messaging associated with adaptive bitrate streaming as disclosed herein.

Methods, apparatus, systems, storage media, etc., to perform media monitoring for mobile platforms using messaging associated with adaptive bitrate streaming are disclosed herein. Example methods disclosed herein to monitor media on a mobile platform include accessing a first uniform resource locator (URL) included in a first message originated by the mobile platform to stream first media according to an adaptive bitrate streaming protocol. Such disclosed example methods also include requesting network log information corresponding to the first URL from a service provider providing network access for the mobile platform. Such disclosed example methods further include monitoring presentation of the first media on the mobile platform using the network log information.

In some such disclosed example methods, the network log information includes (1) a timestamp corresponding to when the first message including the first URL was logged by the network, and/or (2) location information specifying a location of the mobile platform at a time when the first message including the first URL was logged by the network. Additionally or alternatively, some such disclosed example methods further include obtaining demographic information, in addition to the network log information, in response to providing the first URL to the service provider. In some such examples, the network log information and the demographic information omit personal information related to a subscriber associated with the mobile platform.

Additionally or alternatively, in some such disclosed example methods, the requesting of the network log information includes sending a request including the first URL and a time range associated with when the first URL was detected to the service provider.

Additionally or alternatively, in some such disclosed example methods, monitoring the presentation of the first media on the mobile platform includes combining the network log information with media identification information associated with the first URL Additionally or alternatively, some such disclosed example methods further include requesting, from the service provider, network log information corresponding to other URLs included in subsequent messages originated by the mobile platform to stream the first media according to the adaptive bitrate streaming protocol. Some such example methods also include determining ratings data associated with the presentation of the first media on the mobile platform using the network log information corresponding to the first URL and the network log information corresponding to the other URLs, with the ratings data having a time granularity corresponding to time intervals between media segments of the first media identified by the first message and the subsequent messages.

Additionally or alternatively, some such example methods disclosed herein further include detecting the first message using at least one of an application executing on the mobile platform or a proxy server in communication with the mobile platform. In some such examples, detecting the first message includes accessing the first message, and processing the first URL in the first message to detect information indicating that the first URL conforms to the adaptive bitrate streaming protocol. In some examples disclosed herein, the adaptive bitrate streaming protocol corresponds to at least one of hypertext transfer protocol (HTTP) live streaming (HLS), dynamic adaptive streaming over HTTP (DASH), smooth streaming, etc.

Some example methods disclosed herein to monitor media on a mobile platform include accessing a request received from an audience measurement entity (AME) for network log information corresponding to a first URL. In such examples, the first URL is associated with a first message originated by the mobile platform to stream first media according to an adaptive bitrate streaming protocol. The adaptive bitrate streaming protocol may correspond to, for example, HLS, DASH, smooth streaming, etc. Some such disclosed example methods also include retrieving the network log information corresponding to the first URL, and returning the network log information to the AME in response to the request.

In some such disclosed example methods, the network log information includes (1) a timestamp corresponding to when the first message including the first URL was logged by the network, and/or (2) location information specifying a location of the mobile platform at a time when the first message including the first URL was logged by the network. Additionally or alternatively, some such disclosed example methods further include omitting personal information related to a subscriber associated with the mobile platform from the network log information before returning the network log information to the AME.

Additionally or alternatively, in some such disclosed example methods, the request received from the AME includes the first URL and a time range associated with when the first URL was detected by the AME. In some such disclosed example methods, retrieving the network log information includes querying network log storage using the first URL and the time range. Some such disclosed example methods also include receiving, in response to the query, a timestamp corresponding to when the first message including the first URL was logged by the network. Some such disclosed example methods further include receiving, in response to the query, location information specifying a location of the mobile platform at a time when the first message including the first URL was logged by the network.

Additionally or alternatively, some such disclosed example methods further include querying a database to obtain demographic information, in addition to the network log information, corresponding to the first URL, and returning the demographic information, in addition to the network log information, to the AME in response to the request. Some such disclosed example methods further include omitting personal information related to a subscriber associated with the mobile platform from the demographic information before returning the demographic information to the AME.

These and other example methods, apparatus, systems, storage media, etc., to perform media monitoring for mobile platforms using messaging associated with adaptive bitrate streaming are disclosed in further detail below.

As mentioned above, prior audience measurement techniques typically rely on monitoring statistically selected panels of audience members to obtain demographic information to be included in and/or used to otherwise augment audience ratings data. However, such panel-based audience measurement techniques may be unable to perform accurate media monitoring for mobile platforms. For example, given the number and variety of media sources accessible via modern mobile platforms, the size of a statistically selected panel may be too small to capture the large number of different media impressions attributable to a population of mobile platform users in a statistically meaningful manner. For example, many online streaming services provide access to thousands, or even millions, of different media programs capable of being viewed on-demand at any time. A typical audience measurement panel may contain only hundreds or a few thousand panelists and, thus, may be unable to accurately reflect the different media impressions occurring in a large population of mobile users able to access such a plethora of different media choices.

Example mobile platform media monitoring solutions disclosed herein, which use messaging associated with adaptive bitrate streaming to perform media monitoring for mobile platforms, are able to solve technical problems associated with obtaining accurate demographic data for use in monitoring media impressions on mobile platforms. For example, some example mobile platform media monitoring solutions disclosed herein solve such problems by using URLs associated with media being streamed to mobile platforms to obtain detailed demographic information from the wireless service providers providing network access to the mobile platforms. Wireless service providers typically maintain databases containing subscriber data providing demographic information concerning their subscribers. Additionally, wireless service providers typically collect network logs documenting the network traffic associated with mobile platforms communicating with their respective networks. Such network logs can contain demographic-related information, such as the locations of the mobile platforms in the network when particular traffic occurred, as well as the specific times when such traffic occurred in the network. Also, the timing data obtainable from the network logs may be more accurate, or have finer granularity, than the timing data that a prior audience measurement system may otherwise be able to determine for monitored media impressions. As disclosed in further detail below, example mobile platform media monitoring solutions disclosed herein enable an audience measurement entity to receive, from a wireless provider, provider data including such demographic information (e.g., location information, subscriber information, etc.) and time information, which can be associated with media impressions monitored on one or more mobile platforms.

Turning to the figures, a block diagram of an example environment of use 100 including an example audience measurement system 102 to perform media monitoring for mobile platforms using messaging associated with adaptive bitrate streaming, as disclosed herein, is illustrated in FIG. 1. The example environment of use 100 of FIG. 1 includes one or more mobile platforms, such as an example mobile platform 105, operating in an example access network 110 implemented by a service provider. In the example environment of use 100 of FIG. 1, the access network 110 provides the mobile platform 105 with access to the Internet 115 and/or any other network, such as a content delivery network (CDN), a proprietary network, etc. Via the example access network 110 and the Internet 115, the mobile platform 105 of the illustrated example is able to access one or more data sources, including one or more media streaming servers, such as an example streaming media server 120. For example, the mobile platform 105 is able to access the streaming media server 120 and/or other servers (e.g., an ad server, etc.) via the access network 110 and the Internet 115, and receive and present media, including media content, such as movies, television program, etc., and/or media advertisements, etc., streamed from the streaming media server 120 and/or the other servers.

The example mobile platform 105 of FIG. 1 can correspond to any mobile device, apparatus, system, etc., such as a mobile phone or smartphone, a tablet computer (e.g., an Apple iPad™), a notebook computer, a gaming device (e.g., a Nintendo 3DS™), a personal digital assistant (PDA), etc. The example access network 110 of FIG. 1 can correspond to any type(s), number and/or combination of access networks, such as a mobile cellular network, a wireless local area network (WLAN), such as a WiFi network, a proprietary wireless network, etc. The example streaming media server 120 of FIG. 1 can correspond to a streaming media service, such as Netflix, Hulu, Amazon, etc., accessible from the mobile platform 105. As such, the streaming media server 120 can be implemented by any type(s), number and/or combination of physical and/or virtual servers and/or platforms, such as the example processing platform 1200 of FIG. 12, capable of streaming media over a network to a media device, such as the mobile platform 105.

The example audience measurement system 102 included in the example environment of use 100 of FIG. 1 includes an example meter 125 and an example AME server 130 that use messaging associated with adaptive bitrate streaming to performing media monitoring for mobile platforms, as disclosed herein. In the illustrated example of FIG. 1, the AME server 130 can be implemented by any type(s), number(s) and/or combination of physical and/or virtual servers and/or platforms, such as the example processing platform 1200 of FIG. 12. In the illustrated example of FIG. 1, the meter 125 can be implemented by any type(s), number(s) and/or combination of application(s) (e.g., apps) executing on the mobile platform 105, and/or monitoring devices electrically coupled to (e.g., via an electrical data port), optically couple to (e.g., via an electrical optical port) and/or otherwise in communication with the mobile platform 105, capable of detecting messages originated by the mobile platform 105 to stream media from the streaming media server 120 according to an adaptive bitrate streaming protocol. For example, the meter 125 of the illustrated example detects adaptive bitrate streaming URLs included in messages originated by the mobile platform 105 and to be sent to the streaming media server 120 to request and stream media segments addressed by the adaptive bitrate streaming URLs.

In some examples, the meter 125 is an application that the service provider automatically installs on the mobile platform 105 and/or causes to be automatically downloaded to the mobile platform 105 via the access network 110. In some examples, the streaming media server 120, or another server, causes the meter 125 to be downloaded to the mobile platform 105 as a condition to access streaming media. Such meters may be referred as non-panelist meters to distinguish them from panelist meters, such as on-device meters, that are provided to panelists statistically selected by an AME for inclusion in an audience measurement panel (and which may include more extensive media monitoring functionality than the non-panelist meters). However, in some examples, the meter 125 may correspond to a panelist mater provided by an AME. As such, the mobile platform media monitoring solutions disclosed herein can be used to monitor a mobile platform regardless of whether the mobile platform is associated with an AME panelist.

In adaptive bitrate streaming, media to be streamed is encoded into two or more alternative media streams having different data rates (and, thus, different quality). Each alternative media stream is then segmented into short segments, such as 10 second segments or segments having some other duration. To receive streaming media from the streaming media server 120 according to an adaptive bitrate streaming protocol, the mobile platform 105 requests successive media segments (e.g., successive 10 sec. segments) using the adaptive bitrate streaming URLs identifying the segments. Each time a next segment is to be requested, the mobile platform 105 can select among the different next segments corresponding to the different alternative streams, thereby permitting the mobile platform 105 to adapt media quality to the available data rate. In the illustrated example of FIG. 1, the meter 125 detects the adaptive bitrate streaming URLs accessed by the mobile platform 105, and provides the detected adaptive bitrate streaming URLs to the AME server 130 for further processing.

For example, the AME server 130 of the illustrated example receives the adaptive bitrate streaming URLs and identifies the media being streamed to and presented by the mobile platform 105 at a resolution corresponding to the segment duration (e.g., such as a 10 second resolution). In some examples, the AME server 130 maintains a database and/or other storage mechanism capable of linking resource identifier information (e.g., domain name and path information) in URLs to different source media. For example, the AME server 130 may determine the resource identifier information for different source media accessible from the streaming media server 120 (and other streaming media servers) via information reported and updated by the operator(s) of the streaming media server 120 (and other streaming media servers), such as Netflix, Hulu, Amazon, etc. Additionally or alternatively, the AME server 130 may determine the particular source media linked to resource identifier information included in the adaptive bitrate streaming URLs reported by meters, such as the meter 125, by accessing the source media addressed by a particular resource identifier and identifying the media using any appropriate media identification technique(s) (e.g., watermark/code matching, signature matching, etc.).

For example, the AME server 130 can use one or more media identification technique(s) employing watermarks and/or signatures to identify media accessed using a resource identifier included in a URL. In the context of media monitoring, watermarks may be transmitted within and/or with media signals. For example, watermarks can be used to transmit data (e.g., such as identification codes, ancillary codes, etc.) with media (e.g., inserted into the audio, video, or metadata stream of media) to uniquely identify broadcasters and/or media (e.g., content or advertisements), and/or to convey other information. Watermarks are typically extracted using a decoding operation.

In contrast, signatures are a representation of some characteristic of the media signal (e.g., a characteristic of the frequency spectrum of the signal). Signatures can be thought of as fingerprints. Signatures are typically not dependent upon insertion of identification codes (e.g., watermarks) in the media, but instead preferably reflect an inherent characteristic of the media and/or the signal transporting the media. Systems to utilize codes (e.g., watermarks) and/or signatures for media monitoring are long known. See, for example, Thomas, U.S. Pat. No. 5,481,294, which is hereby incorporated by reference in its entirety.

Returning to the example environment of use 100 of FIG. 1, the AME server 130 provides the adaptive bitrate streaming URLs detected for one or more mobile platforms, such as the mobile platform 105, as well as any timing data associated therewith, to the service provider operating the access network 110 to request provider information, such as network log information, subscriber information, etc., to be used to augment the audience ratings data determined by the AME. In the illustrated example, the AME server 130 provides (e.g., in real-time, at reporting intervals, etc.) the adaptive bitrate streaming URLs detected for one or more mobile platforms, such as the mobile platform 105, to an example operations support system (OSS) 135 used by the service provider to manage the example access network 110. In the illustrated example of FIG. 1, the OSS 135 includes an example network log server 140 to store network logs documenting the network traffic associated with mobile platforms, such as the mobile platform 105, operating in and/or communicating with the provider's access network 110. The example OSS 135 of FIG. 1 also includes an example subscriber database server 145 to store subscriber data, which includes demographic information concerning the provider's subscribers. The network log server 140 and/or the subscriber database server 145 can be implemented by any type(s), number(s) and/or combination of physical and/or virtual servers and/or platforms, such as the example processing platform 1200 of FIG. 12.

In some examples, in response to receiving the adaptive bitrate streaming URLs in a request for provider information, the OSS 135 compares the adaptive bitrate streaming URLs to the network logs stored in the network log server 140 to, for example, identify the mobile platform(s), such as the mobile platform 105, that accessed the adaptive bitrate streaming URLs, identify the times at which the adaptive bitrate streaming URLs were accessed/logged, determine location information for the mobile platform, such as the mobile platform 105, at the times the adaptive bitrate streaming URLs were accessed/logged, etc. In some examples, the OSS 135 uses the mobile platform identification information obtained from the network logs to further retrieve subscriber data associated with the identified mobile platform(s), such as the mobile platform 105, from the subscriber database server 145. Such subscriber data can include, for example, any demographic-related data, such as an address of the subscriber, an age of the subscriber, a gender of the subscriber, an ethnicity of the subscriber, an income of the subscriber, an education level of the subscriber, a service tier subscribed to by the subscriber, etc., and/or any other subscriber data stored in the subscriber database server 145. Because the adaptive bitrate streaming URLs included in request(s) from the AME server 130 may be associated with any customers/subscribers, and not just panelists of the AME, the OSS 135 can retrieve network log information and/or subscriber data associated with any customers/subscribers, and not just panelists of the AME.

In some examples, the AME server 130 includes a time range or ranges corresponding to when the adaptive bitrate streaming URLs were detected/logged by the meter 125 in the request(s) for provider information sent to the OSS 135. In such examples, the time range(s) can assist the OSS 135 in narrowing the search of the network logs stored by the network log server 140 and/or the search of the subscriber data stored in the subscriber database server 145 when determining the provider information to be reported in response to the request. For example, if the request for provider information includes adaptive bitrate streaming URLs for multiple different mobile platforms and/or corresponds to a substantially long time interval (e.g., tens of minutes, hours, etc.), timing data provided by the AME server 130 in the request may assist the OSS 135 to narrow its searches to the relevant times/time ranges. In some examples, the timing data available to the AME server 130 is less accurate than the timing data maintained by the network log server 140 or, more generally, the OSS 135 and, as such, the AME server 130 is able to use the timing data (e.g., timestamps) retrieved from the network log server 140 to improve monitoring accuracy.

In some examples, the OSS 135 processes the retrieved network log information and/or subscriber data corresponding to the adaptive bitrate streaming URLs to determine provider information including the network log information and/or subscriber data. In some examples, such data is aggregated or otherwise made anonymous to protect the privacy of the service provider's subscribers (e.g., and, thus, the users of the mobile platform, such as the mobile platform 105, operating in and/or communicating with the access network 110.). For example, the resulting network log information returned by the OSS 135 to the AME server 130 for the adaptive bitrate streaming URLs included in the request can include, but is not limited to, timestamps indicating the times at which the adaptive bitrate streaming URL(s) were accessed/logged, location data (e.g., such as location information generalized to a cell identifier level, ZIP+4 data level, etc.) indicating the location(s) of the mobile platform(s), such as the mobile platform 105, when the adaptive bitrate streaming URL(s) was(were) accessed/logged, etc., but which omits any personal identification information. Similarly, the resulting subscriber data returned by the OSS 135 to the AME server 130 for the adaptive bitrate streaming URLs included in the request can include, but is not limited to, demographic data, such as age, ethnicity, income, education, etc., but which omits any personal identification information.

In the example environment of use 100 of FIG. 1, the AME server 130 receives the service provider information (e.g., network log information, subscriber data, etc.) determined to correspond to the adaptive bitrate streaming URLs provided in the prior request(s) sent by the AME server 130 to the OSS 135. In some examples, the AME server 130 combines media identification information identifying the media accessed using the adaptive bitrate streaming URLs with the service provider information (e.g., timestamps, location information and/or other demographic data, etc.) returned by the OSS 135 to determine audience ratings data for monitoring media impressions on the mobile platform. As noted above, the AME server 130 can determine the particular media accessed by the adaptive bitrate streaming URLs using a previously determined mapping of URL resource identifier information to particular media sources, by detecting identification information embedded in or otherwise accompanying the streamed media, etc. By combining the media identification information available to the AME server 130 with the provider information provided by the service provider (e.g., via the OSS 135), the resulting ratings data determined by the AME server 130 is not only able to identify the media corresponding to media impressions monitored on the mobile platform 105, but is also able to indicate, for example, the time and location of the mobile platform 105 when the media impression occurred, as well as other demographic information characterizing the user exposed to the media impression.

Figure 2A:
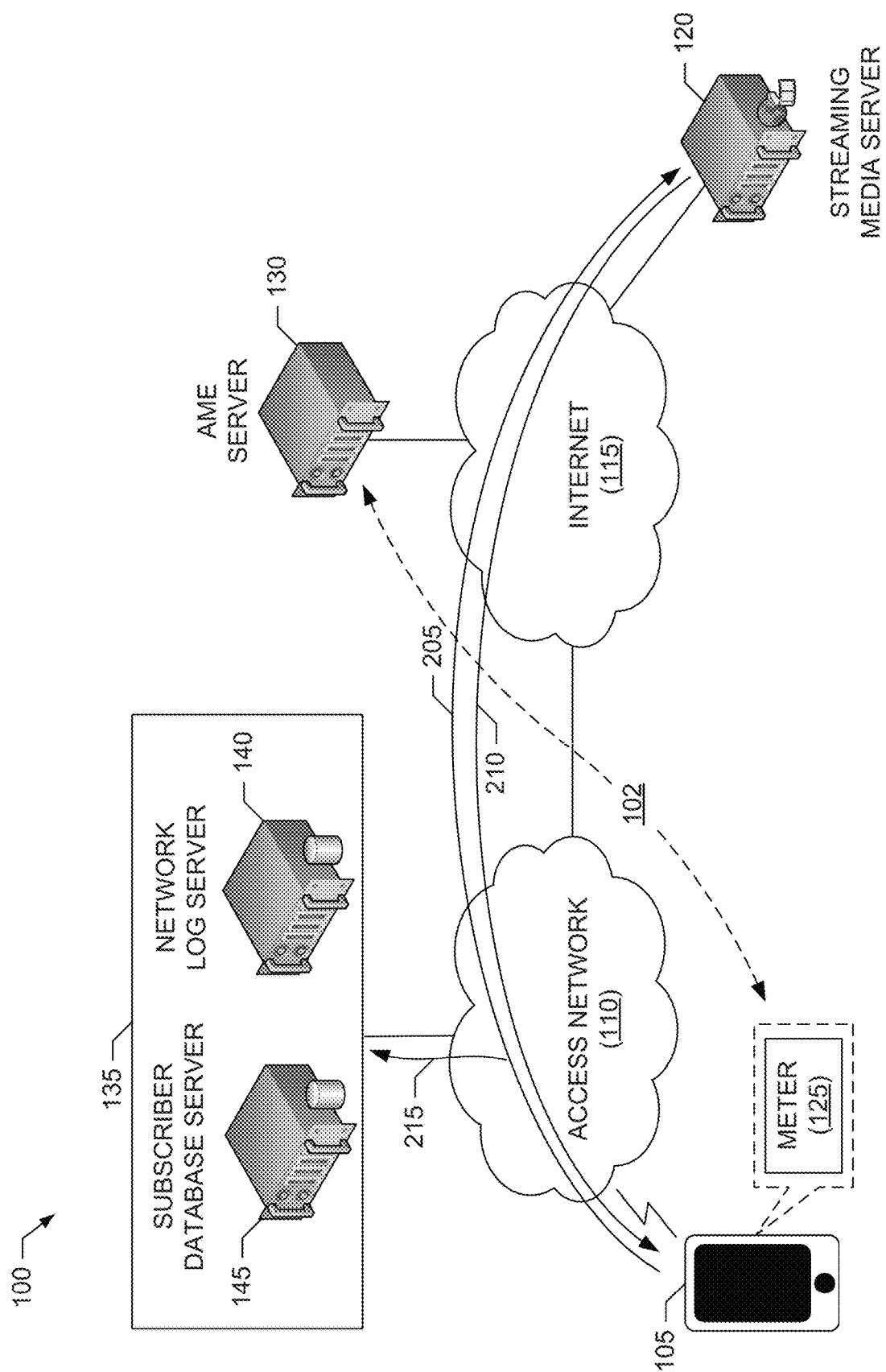
FIGS. 2A-C depict an example procedure to perform media monitoring for mobile platforms using messaging associated with adaptive bitrate streaming in the first example environment of use of FIG. 1.
Figure 2B:
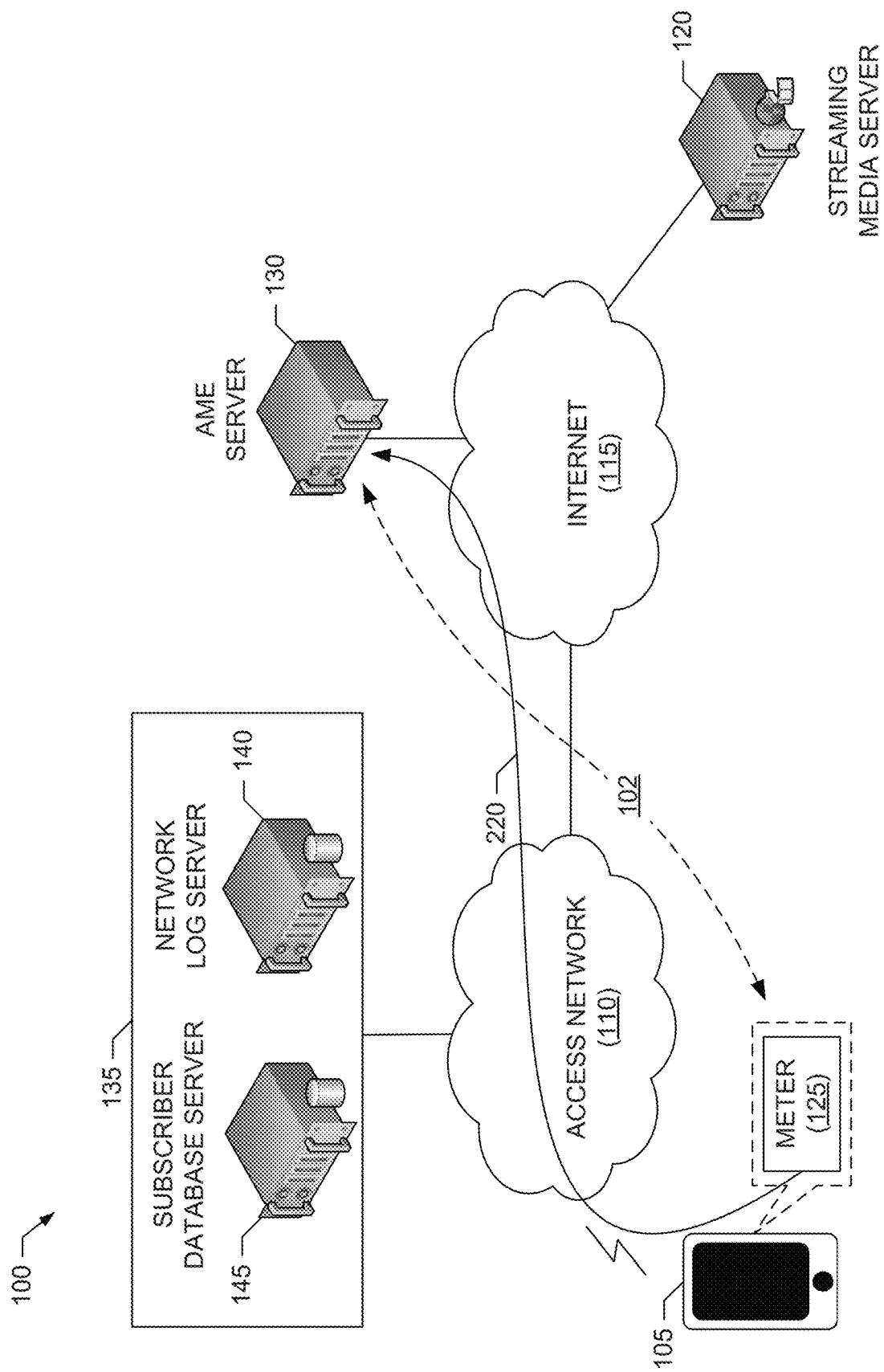
Figure 2C:
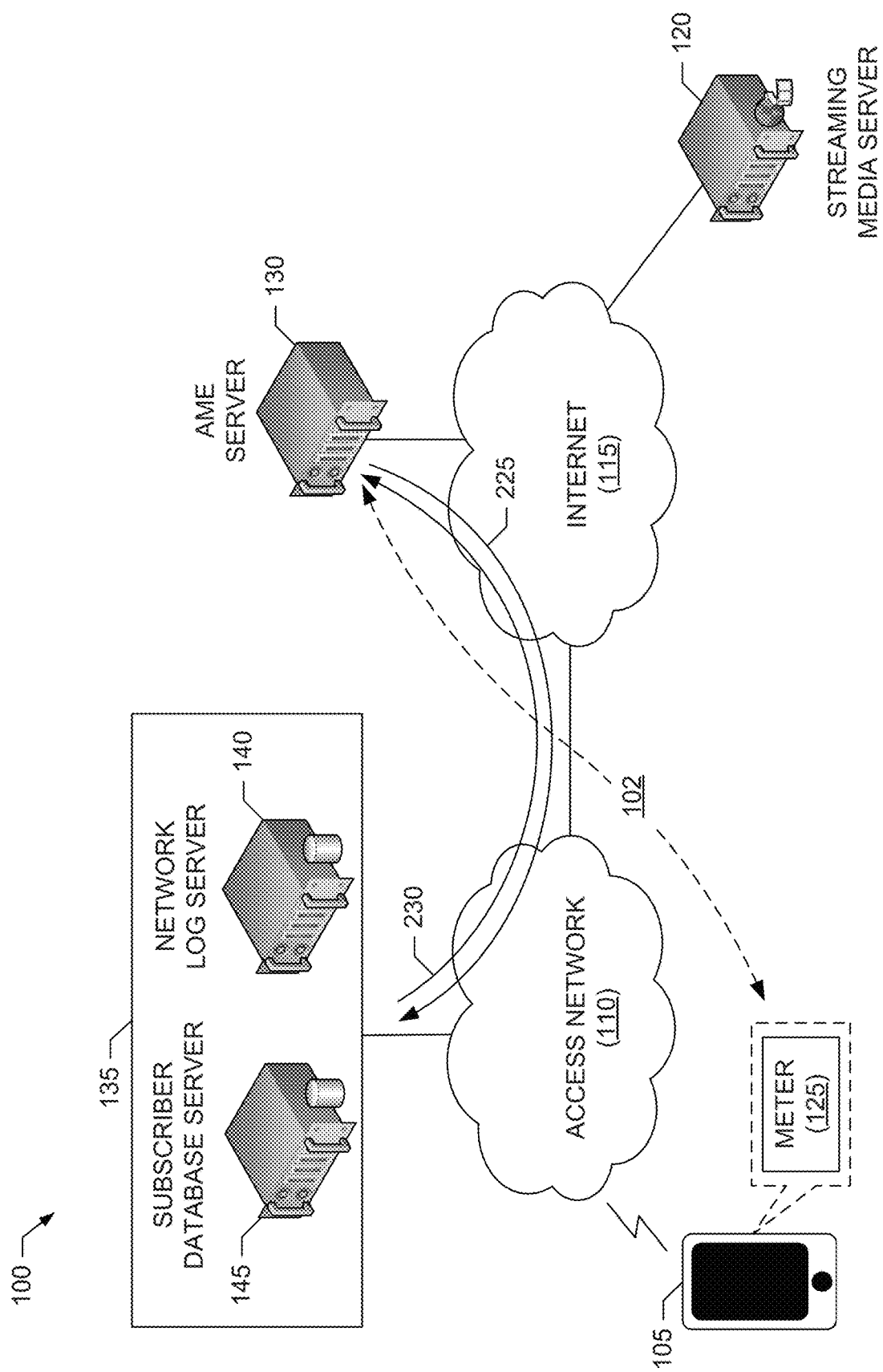

An example procedure to perform media monitoring for mobile platforms using messaging associated with adaptive bitrate streaming in the example environment of use 100 of FIG. 1 is illustrated in FIGS. 2A-C. The example procedure begins in FIG. 2A with the example mobile platform 105 originating example messages 205 including adaptive bitrate streaming URLs, which are sent to the example streaming media server 120 to request delivery of streaming media. In response, the streaming media server 120 streams successive example segments 210 of the requested media to the mobile platform 105. As mentioned above, in adaptive bitrate streaming, media to be streamed is segmented into segments of a specified duration, such as 10 seconds or some other duration. Accordingly, the sequence of adaptive bitrate streaming URLs identify the sequence of segments forming the media stream at a resolution (e.g., 10 second) corresponding to the duration of the segments. In the illustrated example of FIGS. 2A-C, the example OSS 135 also logs contents of the messages 205 (represented in FIG. 2A by the directed line 215), such as the adaptive bitrate streaming URLs, and other network information, such as timestamps indicating when the respective messages 205 were logged, location(s) of the mobile platform 105 at the times when the messages 205 were logged, etc.

In some examples, the messages 205 correspond to a sequence of hypertext transfer protocol (HTTP) GET request messages including respective adaptive bitrate streaming URLs identifying successive message segments forming the media stream to be delivered to the mobile platform 105. Two example sequences of adaptive bitrate streaming URLs that may be included in respective sequences of the messages 205 to request different streaming media are shown in Tables 1 and 2.

TABLE 1

A First Example of Adaptive Bitrate Streaming URLs https://httpls-e.hulu.com/httpls/835/60201835/agave50423849_15039944_H264_TV_650.tar/
    segment0.ts?expire=1365515090&token=35e64536db720b0653659237beb784b7&br=650
https://httplse.hulu.com/httpls/835/60201835/agave50423849_15039944_H264_TV_650.tar/
    segment1.ts?expire=1365515090&token=d045692f7ff2bbbe1ec15a6d8c5bab85&br=650
https://httplse.hulu.com","/httpls/835/60201835/agave50423849_15039944_H264_TV_650.tar/
    segment2.ts?expire=1365515090&token=b77d248ce0eab358f2725b8064ca3e6b&br=650
https://httpls1.hulu.com","/835/60201835/agave50423849_15039945_H264_1000.tar/
    segments3.ts?br=1000&end=20130409134450&authToken=061c23f7213ac24ab6b2d

TABLE 2

A Second Example of Adaptive Bitrate Streaming URLs https://lpcdn01.nflximg.com/779/1255352779.aac?etime=20130414112326&movieHash=849&
    encoded=05196ad63c66d888ba1c3&random=327768656
https://lpcdn04.nflximg.com/907/1898487907.ts.prdy?etime=20130414112326&movieHash=849&
    encoded=0a3c955e0dcc1b9fab07f&random=3140026443
https://lpcdn04.nflximg.com/907/1898487907.ts.prdy?etime=20130414112326&movieHash=849&
    encoded=0a3c955e0dcc1b9fab07f&random=3140026443
https://lpcdn04.nflximg.com/907/1898487907.ts.prdy?etime=20130414112326&movieHash=849&
    encoded=0a3c955e0dcc1b9fab07f&random=3140026443
https://lpcdn04.nflximg.com/907/1898487907.ts.prdy?etime=20130414112326&movieHash=849&
    encoded=0a3c955e0dcc1b9fab07f&random=3140026443
https://lpcdn04.nflximg.com/907/1898487907.ts.prdy?etime=20130414112326&movieHash=849&
    encoded=0a3c955e0dcc1b9fab07f&random=3140026443
https://lpcdn04.nflximg.com/907/1898487907.ts.prdy?etime=20130414112326&movieHash=849&
    encoded=0a3c955e0dcc1b9fab07f&random=3140026443

With reference to FIG. 2B, the example meter 125 detects the messages 205 originated by the mobile platform 105 and containing the adaptive bitrate streaming URLs. The meter 125 logs the adaptive bitrate streaming URLs included in the detected messages 205, and reports the adaptive bitrate streaming URLs (e.g., in real-time, at reporting intervals, etc.) to the example AME server 130, as represented by the directed line 220 in FIG. 2B. In some examples, the meter 125 also includes a time or a time range associated with a respective individual adaptive bitrate streaming URL or a respective group of adaptive bitrate streaming URLs to indicate, for example, a window of time during which the adaptive bitrate streaming URL(s) was(were) collected by the meter 125.

In some examples, the meter 125 is configured to detect the messages 205 by (1) filtering or otherwise detecting HTTP GET request messages and/or other messages capable of carrying adaptive bitrate streaming URLs, and (2) detecting the adaptive bitrate streaming URLs included in the filtered messages. In some examples, the meter 125 is configured to detect the adaptive bitrate streaming URLs by parsing or otherwise searching the contents of detected HTTP GET request messages for keywords, text strings, etc., indicative of a URL format used by an adaptive bitrate streaming protocol, such as HLS, DASH, smooth streaming, etc. For example, and with reference to Tables 1 and 2, the meter 125 may be configured to search for keywords and/or text strings, such as "segmentN.ts" (where "N" is an integer), ".ts.prdy," etc., in the URLs included in the detected HTTP GET request messages to determine that the URLs correspond to adaptive bitrate streaming URLs. Additionally or alternatively, the meter 125 may be configured to detect adaptive bitrate streaming URLs by searching for patterns of URLs in successive detected messages that are indicative of patterns associated with adaptive bitrate streaming. For example, the meter 125 may determine that a sequence of URLs included in a corresponding sequence of detected messages correspond to adaptive bitrate streaming URLs if the URLs point to a common domain name, share similar path data, and are spaced apart in time by a duration consistent with an adaptive bitrate streaming protocol.

With reference to FIG. 2C, the example AME server 130 sends requests 225 to the example OSS 135 to request provider information, such as network log information, subscriber demographic data, etc., corresponding to adaptive bitrate streaming URLs included in the requests 225. The adaptive bitrate streaming URLs included in the requests 225 may correspond to a sequence of URLs collected for one mobile platform, such as the mobile platform 105, or sequences of URLs collected for a group of mobile platforms. The OSS 135 uses the adaptive bitrate streaming URLs included in the requests 225, as well as any timing data provided by the AME server 130, to query the network log server 140 for network log information, such as timestamps (which may be more accurate than any timing data provided by the AME server in the requests 225), location information, etc., corresponding to the adaptive bitrate streaming URLs. In some examples, the OSS 135 also uses the adaptive bitrate streaming URLs included in the requests 225, and/or the network log information retrieved from the network log server 140 in response to the queries, to query the subscriber database server 145 for subscriber demographic data corresponding to the adaptive bitrate streaming URLs. The OSS 135 then sends responses 230 to the AME server 130 containing the provider data, such as the retrieved network log information (e.g., timestamps, location data, etc.) and/or the subscriber demographic data, corresponding to the adaptive bitrate streaming URLs included in the requests 225. In some examples, the OSS 135 processes the network log information retrieved from the network log server 140 and/or the subscriber demographic data retrieved from the subscriber database server 145 to omit personal identification data before including the network log information and/or the subscriber demographic data in the responses 230 to be sent to the AME server 130. The AME server 130 then uses the provider information included in the responses 230 to monitor media impressions on the mobile platform 105 and to determine associated audience rating data.

Figure 3:
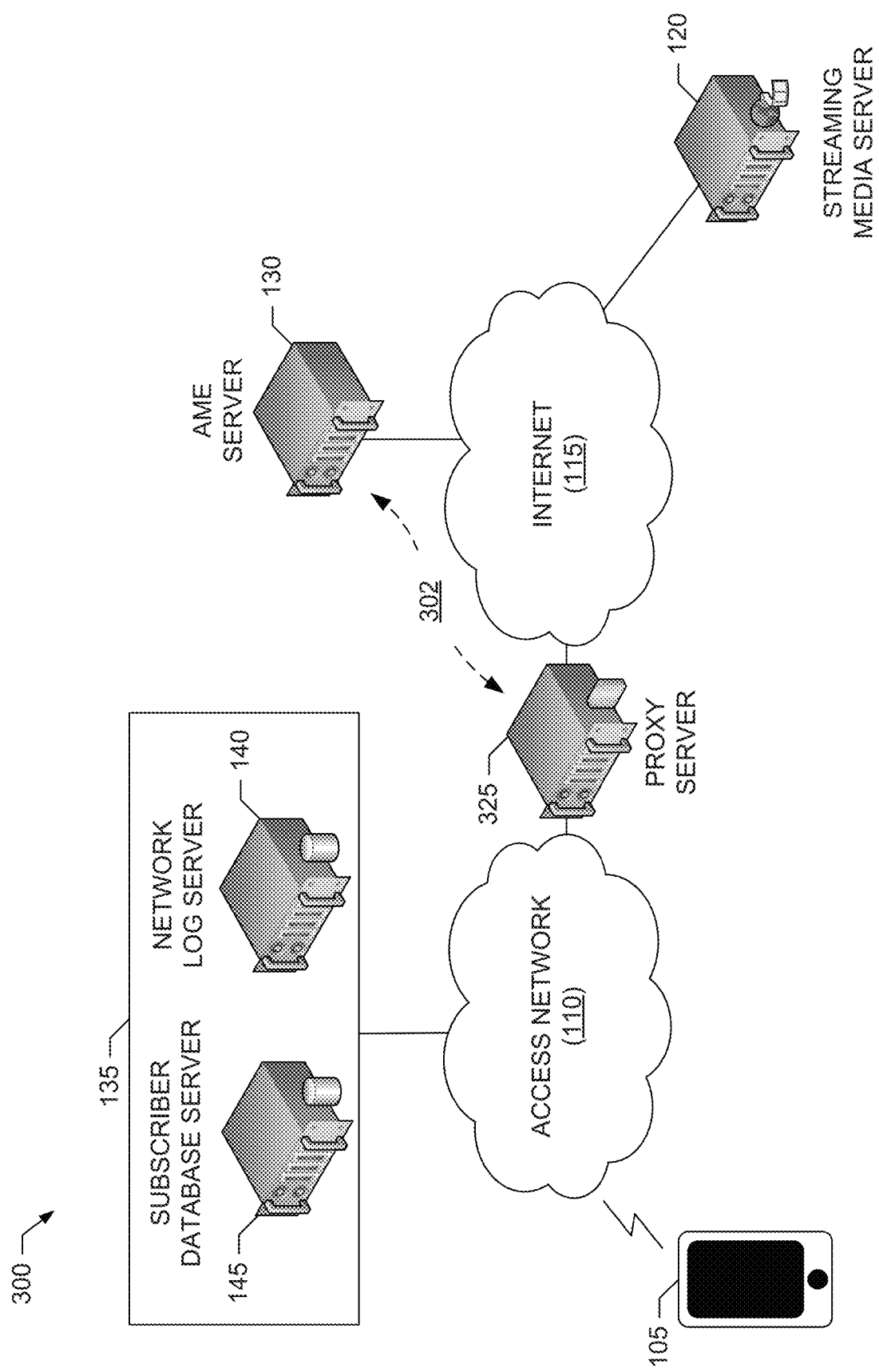
FIG. 3 is a block diagram of a second example environment of use including a second example audience measurement system to perform media monitoring for mobile platforms using messaging associated with adaptive bitrate streaming as disclosed herein.

A block diagram of a second example environment of use 300 including a second example audience measurement system 302 to perform media monitoring for mobile platforms using messaging associated with adaptive bitrate streaming as disclosed herein is illustrated in FIG. 3. The second example environment of use 300 includes many elements in common with the environment of use 100 of FIGS. 1 and 2A-C. As such, like elements in FIGS. 1 and 3 are labeled with the same reference numerals. The detailed descriptions of these like elements are provided above in connection with the discussions of FIGS. 1 and 2A-C and, in the interest of brevity, are not repeated in the discussion of FIG. 3.

Turning to FIG. 3, the example environment of use 300 includes the example mobile platform 105, the example access network 110, the Internet 115, the example media streaming server 120, the example OSS 135, the example network log server 140 and the example subscriber database server 145 of FIG. 1. The example audience measurement system 302 included in the example environment of use 300 of FIG. 3 also includes the example AME server 130 of FIG. 1. Descriptions of these elements are provided above in connection with the descriptions of FIGS. 1 and 2A-C. However, instead of including the meter 125 to monitor the mobile platform 105, the example audience measurement system 302 included in the example environment of use 300 of FIG. 3 includes an example proxy server 325 to detect the messages 205 originated by the mobile platform 105 and including adaptive bitrate streaming URLs to be used for media monitoring. In the illustrated example of FIG. 3, the mobile platform 105 is configured to access the Internet 115 (or other network) via the proxy server 325. Some example techniques for configuring the mobile platform 105 to access the Internet 115 (or other network) via the proxy server 325 are described in U.S. Patent Publication No. 2012/0042005, U.S. Patent Publication No. 2012/0042367 and U.S. Pat. No. 8,594,617, which are incorporated herein by reference in their respective entireties. The proxy server 325 detects the messages 205 from the mobile platform 105 and/or other mobile platforms configured to access the Internet 115 (or other network) via the proxy server 325, logs the detected messages 205, and reports the adaptive bitrate streaming URLs (e.g., in real-time, at reporting intervals, etc.) to the example AME server 130. In some examples, the proxy server 325 also includes a time or a time range associated with an individual adaptive bitrate streaming URL or a group of adaptive bitrate streaming URLs to indicate, for example, a window of time during which the adaptive bitrate streaming URL(s) was(were) collected by the proxy server 325.

In some examples, the proxy server 325 is configured to detect the messages 205 by (1) filtering or otherwise detecting HTTP GET request messages and/or other messages capable of carrying adaptive bitrate streaming URLs, and (2) detecting the adaptive bitrate streaming URLs included in the filtered messages. Like the example meter 125, in some examples, the proxy server 325 is configured to detect the adaptive bitrate streaming URLs by parsing or otherwise searching the contents of detected HTTP GET request messages for keywords, text strings, etc., indicative of a URL format used by an adaptive bitrate streaming protocol, such as HLS, DASH, smooth streaming, etc. For example, and with reference to Tables 1 and 2, the proxy server 325 may be configured to search for keywords and/or text strings, such as "segmentN.ts" (where "N" is an integer), ".ts.prdy," etc., in the URLs included in detected HTTP GET request messages to determine that the URLs correspond to adaptive bitrate streaming URLs. Additionally or alternatively, like the meter 125, the proxy server 325 may be configured to detect adaptive bitrate streaming URLs by searching for patterns of URLs in successive detected messages that are indicative of patterns associated with adaptive bitrate streaming. For example, the proxy server 325 may determine that a sequence of URLs included in a corresponding sequence of detected messages corresponds to adaptive bitrate streaming URLs if the URLs point to a common domain name, share similar path data, and/or are spaced apart in time by a duration consistent with an adaptive bitrate streaming protocol.

Although example mobile platform media monitoring solutions have been disclosed herein in the context of the example environments of use 100 and 300, such solutions are not limited thereto. For example, a system that is to use messaging associated with adaptive bitrate streaming to perform media monitoring for mobile platforms as disclosed herein may include any number(s) and/or type(s) of mobile platforms 105, access networks 110, Internet and/or other networks 115, media streaming servers 120, OSSs 135, network log servers 140 and/or subscriber database servers 145. Additionally or alternatively, a system that is to use messaging associated with adaptive bitrate streaming to perform media monitoring for mobile platforms as disclosed herein may include multiple AME servers 130, such as different servers configured to monitor different access networks 110 and, thus, configured to interface with different OSSs 135. Additionally or alternatively, a system that is to use messaging associated with adaptive bitrate streaming to perform media monitoring for mobile platforms as disclosed herein may include one or more meters 125, one or more proxy servers 325, and/or any combination thereof to collect the adaptive bitrate streaming URLs corresponding to the different media being streamed to different mobile platforms. Also, using messaging associated with adaptive bitrate streaming to perform media monitoring for mobile platforms as disclosed herein is not limited to use with wireless access networks, but can be used with any type of access network for which network log information and/or subscriber demographic data is maintained.

Figure 4:
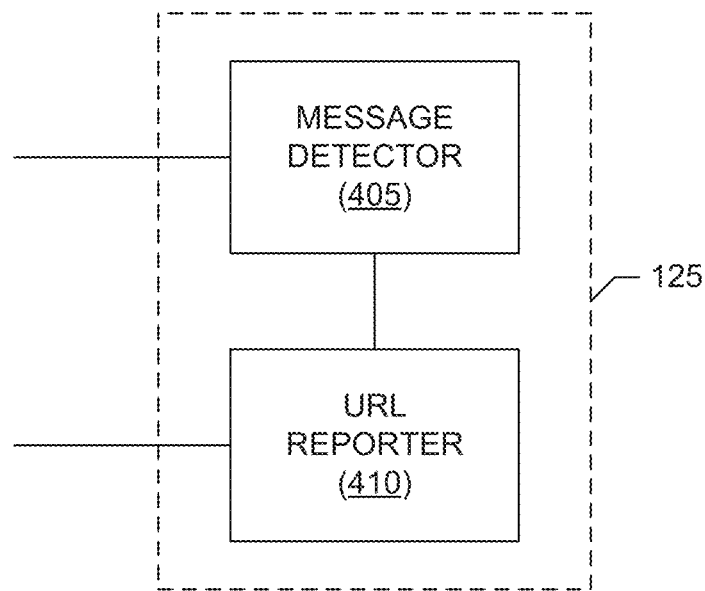
FIG. 4 is a block diagram of an example implementation of the meter of FIG. 1, which is to monitor the example mobile platform to detect and report messaging data associated with adaptive bitrate streaming of media to the mobile platform.

A block diagram of an example implementation of the meter 125 included in the example environment of use 100 of FIGS. 1 and 2A-C is illustrated in FIG. 4. For convenience and without loss of generality, the meter 125 of FIG. 4 is described in the context of being used to monitor the example mobile platform 105 in the example environment of use 100 of FIGS. 1 and 2A-C. The example meter 125 of FIG. 4 includes an example message detector 405 to detect messages that include adaptive bitrate streaming URLs, such as the example messages 205 originated by the mobile platform 105. In some examples, the message detector 405 detects the messages 205 by initially filtering messages originated at the mobile platform 105 (e.g., message prepared and to be sent by the mobile platform 105) to identify those candidate messages likely to include adaptive bitrate streaming URLs, such as HTTP GET messages. For example, the message detector 405 may be configured to monitor a protocol call stack, such as a transmission control protocol/Internet protocol (TCP/IP) protocol stack, implemented on the mobile platform 105, and/or to monitor one or more network interfaces of the mobile platform 105, etc., to capture and filter (e.g., identify) candidate messages, such as HTTP GET messages, being prepared for transmission by the mobile platform 105.

In some examples, the message detector 405 then processes the filtered, candidate messages to detect adaptive bitrates streaming URLs included in the messages. For example, and as described above, the message detector 405 may be configured to detect the adaptive bitrate streaming URLs by parsing or otherwise searching the contents of candidate messages, such as HTTP GET messages originated by the mobile platform 105, for keywords, text strings, etc., indicative of a URL format used by an adaptive bitrate streaming protocol, such as HLS, DASH, smooth streaming, etc. Additionally or alternatively, the message detector 405 may be configured to detect adaptive bitrate streaming URLs by searching for patterns of URLs in successive candidate messages that are indicative of patterns associated with adaptive bitrate streaming. For example, and as described above, the message detector 405 may determine that a sequence of URLs included in a respective sequence of candidate messages, such as HTTP GET messages originated by the mobile platform 105, correspond to adaptive bitrate streaming URLs if the URLs point to a common domain name, share similar path data, and/or are spaced apart in time by a duration consistent with an adaptive bitrate streaming protocol.

The example meter 125 of FIG. 4 also includes an example URL reporter 410 to log the adaptive bitrate streaming URLs detected by the message detector 405. For example, the URL reporter 410 may store the detected adaptive bitrate streaming URLs in volatile and/or non-volatile memory, storage, etc., such as the example volatile memory 1214, the example non-volatile memory 1216, and/or the example mass storage device(s) 1228, etc., included in the example processor platform 1200 of FIG. 12. The URL reporter 410 of the illustrated example also reports the logged adaptive bitrate streaming URLs to, for example, the AME server 130. For example, the URL reporter 410 may report the logged adaptive bitrate streaming URLs in real-time, at reporting intervals, when a storage threshold is met, etc., or via any combination of these techniques. In some examples, the URL reporter 410 also includes times or time ranges associated with respective individual adaptive bitrate streaming URLs or respective groups of adaptive bitrate streaming URLs in the information reported to the AME server 130 to indicate, for example, windows of time during which different adaptive bitrate streaming URLs, or groups of URLs, were collected by the meter 125.

Figure 5:
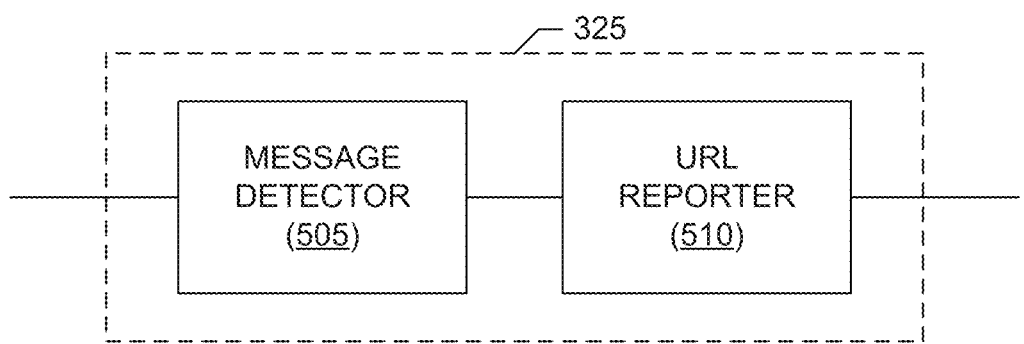
FIG. 5 is a block diagram of an example implementation of the proxy server of FIG. 3, which is to detect and report messaging data associated with adaptive bitrate streaming of media to mobile platform(s).

A block diagram of an example implementation of the proxy server 325 included in the example environment of use 300 of FIG. 3 is illustrated in FIG. 5. For convenience and without loss of generality, the proxy server 325 of FIG. 5 is described in the context of being used to collect and report adaptive bitrate streaming URLs included in messages sent by mobile platform(s), such as the example mobile platform 105, in the example environment of use 300 of FIG. 3. The example proxy server 325 of FIG. 5 includes an example message detector 505 to detect messages, such as the example messages 205, originated by mobile platforms, such as the mobile platform 105, and which include adaptive bitrate streaming URLs. In some examples, the message detector 505 detects the messages 205 by initially filtering messages originated by and received from mobile platforms, such as the mobile platform 105, to identify those candidate messages likely to include adaptive bitrate streaming URLs, such as HTTP GET messages.

In some examples, the message detector 505 then processes the filtered, candidate messages to detect adaptive bitrate streaming URLs included in the messages. For example, and as described above, the message detector 505 may be configured to detect the adaptive bitrate streaming URLs by parsing or otherwise searching the contents of candidate messages, such as HTTP GET messages originated by and received from mobile platforms, such as the mobile platform 105, for keywords, text strings, etc., indicative of a URL format used by an adaptive bitrate streaming protocol, such as HLS, DASH, smooth streaming, etc. Additionally or alternatively, the message detector 505 may be configured to detect adaptive bitrate streaming URLs by searching for patterns of URLs in successive candidate messages that are indicative of patterns associated with adaptive bitrate streaming. For example, and as described above, the message detector 505 may determine that a sequence of URLs included in a corresponding sequence of candidate messages, such as HTTP GET messages originated by and received from mobile platforms, such as the mobile platform 105, correspond to adaptive bitrate streaming URLs if the URLs point to a common domain name, share similar path data, and are spaced apart in time by a duration consistent with an adaptive bitrate streaming protocol.

The example proxy server 325 of FIG. 4 also includes an example URL reporter 510 to log the adaptive bitrate streaming URLs detected by the message detector 505. For example, the URL reporter 510 may store the detected adaptive bitrate streaming URLs in volatile and/or non-volatile memory, storage, etc., such as the example volatile memory 1214, the example non-volatile memory 1216, and/or the example mass storage device(s) 1228, etc., included in the example processor platform 1200 of FIG. 12. The URL reporter 510 of the illustrated example also reports the logged adaptive bitrate streaming URLs to, for example, the AME server 130. For example, the URL reporter 510 may report the logged adaptive bitrate streaming URLs in real-time, at reporting intervals, when a storage threshold is met, etc., or any combination thereof. In some examples, the URL reporter 510 also includes times or time ranges associated with respective individual adaptive bitrate streaming URLs or respective groups of adaptive bitrate streaming URLs in the information reported to the AME server 130 to indicate, for example, windows of time during which different adaptive bitrate streaming URLs, or groups of URLs, were collected by the proxy server 325.

Figure 6:
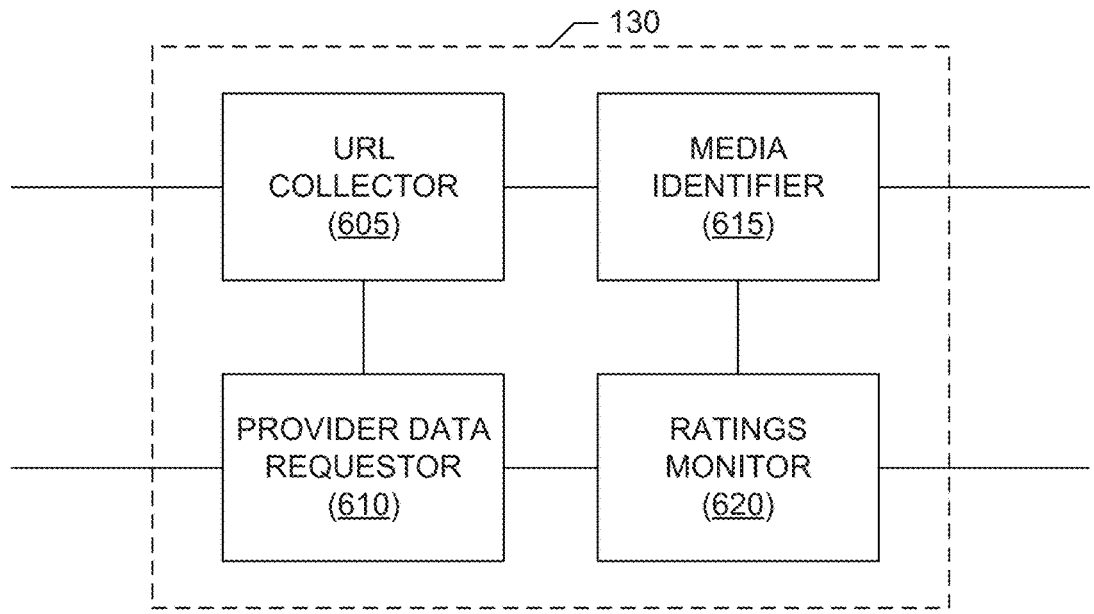
FIG. 6 is a block diagram of an example implementation of the audience measurement entity server of FIGS. 1 and/or 3, which is to collect messaging data associated with adaptive bitrate streaming and to use the messaging data to monitor media on mobile platform(s).

A block diagram of an example implementation of the AME server 130 included in the example environments of use 100 and/or 300 of FIGS. 1 and 3, respectively, is illustrated in FIG. 6. The example AME server 130 of FIG. 6 includes an example URL collector 605 to collect (e.g., receive and store) adaptive bitrate streaming URLs reported by meter(s), such as the example meter 125, and/or proxy server(s), such as the example proxy server 325, operating in the example environments of use 100 and/or 300. For example, the URL collector 605 may store the reported adaptive bitrate streaming URLs, along with any times and/or time range reported with the URLs, in volatile and/or non-volatile memory, storage, etc., such as the example volatile memory 1214, the example non-volatile memory 1216, and/or the example mass storage device(s) 1228, etc., included in the example processor platform 1200 of FIG. 12.

The example AME server 130 of FIG. 6 also includes an example provider data requestor 610 to request, from one or more service providers, information, such as network log information, subscriber demographic data, etc., corresponding to the adaptive bitrate streaming URLs collected by the URL collector 605. In some examples, the provider data requestor 610 sends requests, such as the example requests 225, to a service provider's OSS, such as the example OSS 135, which include the adaptive bitrate streaming URLs for which provider information is requested. The adaptive bitrate streaming URLs may correspond to one or more URLs (e.g., such as a sequence of URLs) collected for one mobile platform, such as the mobile platform 105, or for several mobile platforms being monitored by the AME server 130. In some examples, the requests 225 sent by the provider data requestor 610 also include times and/or time range information associated with the adaptive bitrate streaming URLs for which provider information is requested. In response to the requests 225, the provider data requestor 610 receives responses, such as the example responses 230, containing the provider information, such as retrieved network log information (e.g., timestamps, location data, etc.) and/or the subscriber demographic data, corresponding to the adaptive bitrate streaming URLs included in the requests 225. In some examples, the provider information included in the responses 230 received by the provider data requestor 610 omits personal identification information to protect the privacy of the service provider's customers.

The example AME server 130 of FIG. 6 further includes an example media identifier 615 to identify the particular media associated with the adaptive bitrate streaming URLs collected by the URL collector 605. In some examples, and as described above, the media identifier 615 maintains a database and/or other storage mechanism capable of linking resource identifier information (e.g., domain name and path information) in URLs to different source media. For example, the media identifier 615 may determine the resource identifier information for different source media accessible from the streaming media server 120 (and/or other streaming media servers) via information reported and updated by the operator(s) of the streaming media server 120 (and/or other streaming media servers), such as Netflix, Hulu, Amazon, etc. Additionally or alternatively, the AME server 130 may determine the particular source media linked to the adaptive bitrate streaming URLs collected by the URL collector 605 by accessing the source media addressed by a particular resource identifier and identifying the media using any appropriate media identification technique(s), such as one or more watermark-based techniques, signature-based techniques, etc.

The example AME server 130 of FIG. 6 includes an example ratings monitor 620 to combine the provider data obtained by the provider data requestor 610 and the media identification data obtained by the media identifier 615 to determine ratings data characterizing, for example, media impressions on mobile platforms, such as the mobile platform 105. In some examples, the ratings monitor 620 combines the media identification information determined by the media identifier 615 for one or a group of adaptive bitrate streaming URLs collected by the URL collector 605 with provider information (e.g., timestamps, location data, subscriber demographic data, etc.) obtained by the provider data requestor 610 for the same adaptive bitrate streaming URL or group of URLs to monitor media impressions associated with a mobile platform, such as the mobile platform 105. In some examples, the ratings monitor 620 determines ratings data for each collected adaptive bitrate streaming URL and, thus, the ratings data has a temporal resolution corresponding to the media segment duration associated with each URL (e.g., such as 10 seconds or some other duration).

For example, for an adaptive bitrate streaming URL or group of URLs collected by the URL collector 605 for the mobile platform 105, the ratings monitor 620 may identify the media associated with the adaptive bitrate streaming URL(s) using the media identification information obtained by the media identifier 615. In such examples, the ratings monitor 620 may use the timestamps included in the provider information obtained by the provider data requestor 610 to determine a time (or time range) corresponding to when a particular segment of the identified media was provided to and/or presented by the mobile platform 105. Additionally or alternatively, the ratings monitor 620 may use the location data included in the provider information obtained by the provider data requestor 610 to determine a location of the mobile platform 105 at the time when the particular segment of the identified media was provided to and/or presented by the mobile platform 105. Additionally or alternatively, the ratings monitor 620 may use the subscriber demographic data included in the provider information obtained by the provider data requestor 610 to determine demographics of the user exposed to the identified media presented by the mobile platform 105. In some examples, the ratings monitor 620 further combines ratings data determined for individual mobile platforms, such as the mobile platform 105, with other mobile platforms and/or other media presentation devices (e.g., such as televisions, desktop computers, gaming consoles, etc.) to determine overall ratings data for one or more audience measurement campaigns.

Figure 7:
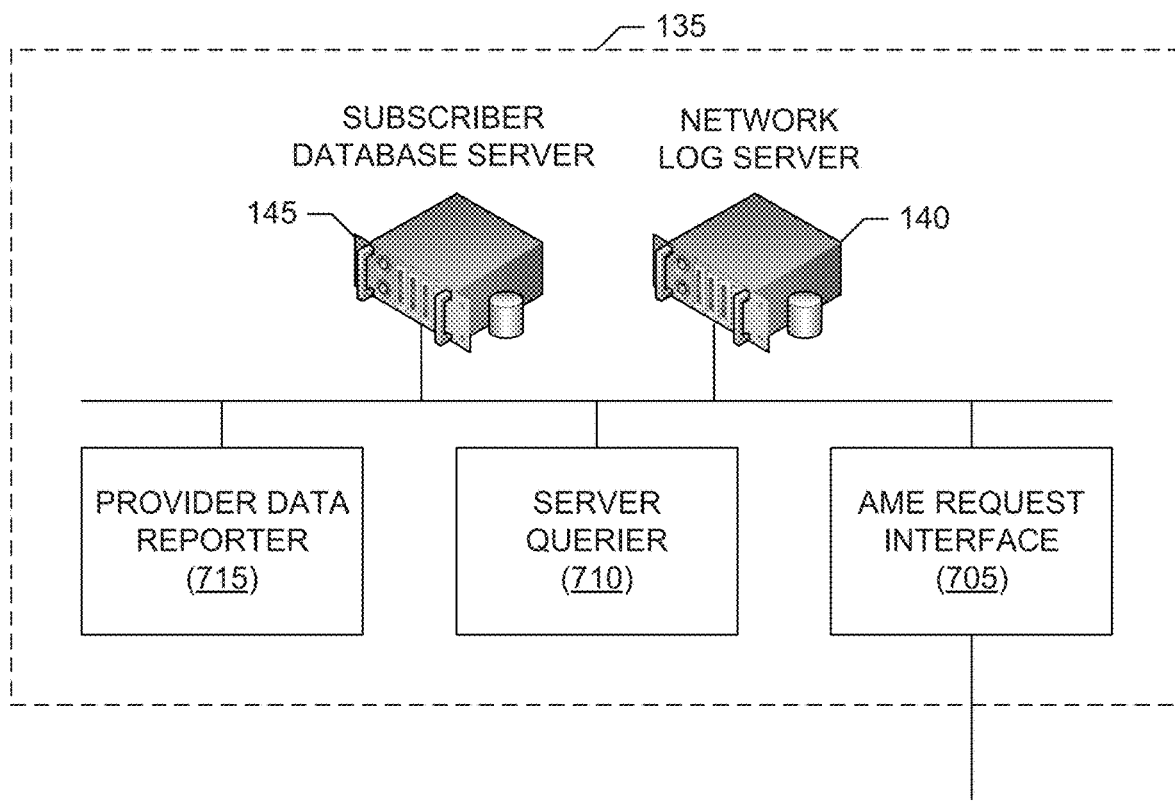
FIG. 7 is a block diagram of an example implementation of the operations support system of FIGS. 1 and/or 3, which is to retrieve service provider data corresponding to messaging data associated with adaptive bitrate streaming and to return such provider data to an audience measurement entity for use in monitoring media on mobile platform(s).

A block diagram of an example implementation of the OSS 135 included in the example environments of use 100 and/or 300 of FIGS. 1 and 3, respectively, is illustrated in FIG. 7. The example OSS 135 of FIG. 7 includes the example network server 140 and the example subscriber database server 145 described above in connection with the descriptions of FIGS. 1-3. The example OSS 135 of FIG. 7 also includes an example AME request interface 705 to receives requests, such as the example requests 225, from AME servers, such as the example AME server 130, for provider information (e.g., network log information, subscriber demographic data, etc.) corresponding to adaptive bitrate streaming URLs specified in the requests. As noted above, the adaptive bitrate streaming URLs specified in the requests may be associated with one or several different mobile platforms. The AME request interface 705 also returns responses, such as the example responses 230, containing the requested provider information to the requesting AME server. The AME request interface 705 can be implemented by an appropriate type(s) and/or number(s) of network and/or data interface(s), such as the example interface circuit 1220 of FIG. 12.

The example OSS 135 of FIG. 7 further includes an example server querier 710 to query provider servers, such as the network server 140 and the subscriber database server 145, to retrieve provider information corresponding to the adaptive bitrate streaming URLs included in the requests received via the AME request interface 705. In some examples, the server querier 710 queries the network log server 140 using contents of an adaptive bitrate streaming URL to retrieve network log information stored in the network log server 140 and associated with the provided URL contents. For example, in response to receiving an adaptive bitrate streaming URL in a query from the server querier 710, the network log server 140 may find a stored network log entry containing a matching adaptive bitrate streaming URL. The network log server 140 may then return other network information, such as a timestamp for the matching log entry, a mobile platform identifier identifying the particular mobile platform associated with the matching log entry, mobile platform location data included in the matching log entry, etc., in a response to the query.

In some examples, the server querier 710 additionally or alternatively queries the subscriber database server 145 using contents of an adaptive bitrate streaming URL and/or network log information obtained from the network log server 140 for the adaptive bitrate streaming URL to retrieve subscriber data stored in the subscriber database server 145 and associated with the URL. For example, in response to receiving a query from the server querier 710 including a mobile platform identifier indicated by the network log information as being associated with an adaptive bitrate streaming URL, the subscriber database server 145 may find a subscriber database entry containing a matching mobile platform identifier. The subscriber database server 145 may then return other subscriber demographic data, such as an address of the subscriber, an age of the subscriber, a gender of the subscriber, an ethnicity of the subscriber, an income of the subscriber, an education level of the subscriber, a service tier subscriber to by the subscriber, etc., in a response to the query.

The example OSS 135 of FIG. 7 includes an example provider data reporter 715 to process provider information, such as the network log information and/or subscriber demographic data retrieved by the server querier 710, before returning the provider information to an AME server, such as the AME server 130, in a response to a query received by the AME request interface 705. In some examples, the provider data reporter 715 processes the network log information and/or subscriber demographic data retrieved by the server querier 710 to omit any personal identification information, such as a subscriber's name, a subscriber's address, a subscriber's customer/subscriber identification number, etc., to thereby protect the privacy of the service provider's customers/subscribers. The provider data reporter 715 then includes the processed provider information in one or more responses, such as the responses 230, to be returned to the requesting AME server via the AME request interface 705.

While example manners of implementing the example audience measurement systems 102 and 302 are illustrated in FIGS. 1-7, one or more of the elements, processes and/or devices illustrated in FIGS. 1-7 may be combined, divided, re-arranged, omitted, eliminated and/or implemented in any other way. Further, the example mobile platform 105, the example access network 110, the Internet 115, the example streaming media server 120, the example meter 125, the example AME server 130, the example OSS 135, the example network log server 140, the example subscriber database server 145, the example proxy server 325, the example message detector 405, the example URL reporter 410, the example message detector 505, the example URL reporter 510, the example URL collector 605, the example provider data requestor 610, the example media identifier 615, the example ratings monitor 620, the example AME request interface 705, the example server querier 710, the example provider data reporter 715 and/or, more generally, the example system 102 and/or the example system 302 may be implemented by hardware, software, firmware and/or any combination of hardware, software and/or firmware. Thus, for example, any of the example mobile platform 105, the example access network 110, the Internet 115, the example streaming media server 120, the example meter 125, the example AME server 130, the example OSS 135, the example network log server 140, the example subscriber database server 145, the example proxy server 325, the example message detector 405, the example URL reporter 410, the example message detector 505, the example URL reporter 510, the example URL collector 605, the example provider data requestor 610, the example media identifier 615, the example ratings monitor 620, the example AME request interface 705, the example server querier 710, the example provider data reporter 715 and/or, more generally, the example system 102 and/or the example system 302 could be implemented by one or more analog or digital circuit(s), logic circuits, programmable processor(s), application specific integrated circuit(s) (ASIC(s)), programmable logic device(s) (PLD(s)) and/or field programmable logic device(s) (FPLD(s)). When reading any of the apparatus or system claims of this patent to cover a purely software and/or firmware implementation, at least one of the example system 102, the example system 302, the example mobile platform 105, the example access network 110, the Internet 115, the example streaming media server 120, the example meter 125, the example AME server 130, the example OSS 135, the example network log server 140, the example subscriber database server 145, the example proxy server 325, the example message detector 405, the example URL reporter 410, the example message detector 505, the example URL reporter 510, the example URL collector 605, the example provider data requestor 610, the example media identifier 615, the example ratings monitor 620, the example AME request interface 705, the example server querier 710 and/or the example provider data reporter 715 is/are hereby expressly defined to include a tangible computer readable storage device or storage disk such as a memory, a digital versatile disk (DVD), a compact disk (CD), a Blu-ray disk, etc. storing the software and/or firmware. Further still, the example systems 102 and/or 302 may include one or more elements, processes and/or devices in addition to, or instead of, those illustrated in FIGS. 1-7, and/or may include more than one of any or all of the illustrated elements, processes and devices.

Flowcharts representative of example machine readable instructions for implementing the example system 102, the example system 302, the example mobile platform 105, the example access network 110, the Internet 115, the example streaming media server 120, the example meter 125, the example AME server 130, the example OSS 135, the example network log server 140, the example subscriber database server 145, the example proxy server 325, the example message detector 405, the example URL reporter 410, the example message detector 505, the example URL reporter 510, the example URL collector 605, the example provider data requestor 610, the example media identifier 615, the example ratings monitor 620, the example AME request interface 705, the example server querier 710 and/or the example provider data reporter 715 are shown in FIGS. 8-11. In these examples, the machine readable instructions comprise one or more programs for execution by a processor, such as the processor 1212 shown in the example processor platform 1200 discussed below in connection with FIG. 12. The one or more programs, or portion(s) thereof, may be embodied in software stored on a tangible computer readable storage medium such as a CD-ROM, a floppy disk, a hard drive, a digital versatile disk (DVD), a Blu-ray Disk™, or a memory associated with the processor 1212, but the entire program or programs and/or portions thereof could alternatively be executed by a device other than the processor 1212 and/or embodied in firmware or dedicated hardware (e.g., implemented by an ASIC, a PLD, an FPLD, discrete logic, etc.). Also, one or more of the machine readable instructions represented by the flowcharts of FIGS. 8-11 may be implemented manually. Further, although the example program(s) is(are) described with reference to the flowcharts illustrated in FIGS. 8-11, many other methods of implementing the example system 102, the example system 302, the example mobile platform 105, the example access network 110, the Internet 115, the example streaming media server 120, the example meter 125, the example AME server 130, the example OSS 135, the example network log server 140, the example subscriber database server 145, the example proxy server 325, the example message detector 405, the example URL reporter 410, the example message detector 505, the example URL reporter 510, the example URL collector 605, the example provider data requestor 610, the example media identifier 615, the example ratings monitor 620, the example AME request interface 705, the example server querier 710 and/or the example provider data reporter 715 may alternatively be used. For example, with reference to the flowcharts illustrated in FIGS. 8-11, the order of execution of the blocks may be changed, and/or some of the blocks described may be changed, eliminated, combined and/or subdivided into multiple blocks.

As mentioned above, the example processes of FIGS. 8-11 may be implemented using coded instructions (e.g., computer and/or machine readable instructions) stored on a tangible computer readable storage medium such as a hard disk drive, a flash memory, a read-only memory (ROM), a compact disk (CD), a digital versatile disk (DVD), a cache, a random-access memory (RAM) and/or any other storage device or storage disk in which information is stored for any duration (e.g., for extended time periods, permanently, for brief instances, for temporarily buffering, and/or for caching of the information). As used herein, the term tangible computer readable storage medium is expressly defined to include any type of computer readable storage device and/or storage disk and to exclude propagating signals and to exclude transmission media. As used herein, "tangible computer readable storage medium" and "tangible machine readable storage medium" are used interchangeably. Additionally or alternatively, the example processes of FIGS. 8-11 may be implemented using coded instructions (e.g., computer and/or machine readable instructions) stored on a non-transitory computer and/or machine readable medium such as a hard disk drive, a flash memory, a ROM, a CD, a DVD, a cache, a RAM and/or any other storage device or storage disk in which information is stored for any duration (e.g., for extended time periods, permanently, for brief instances, for temporarily buffering, and/or for caching of the information). As used herein, the term non-transitory computer readable medium is expressly defined to include any type of computer readable storage device and/or storage disk and to exclude propagating signals and to exclude transmission media. As used herein, when the phrase "at least" is used as the transition term in a preamble of a claim, it is open-ended in the same manner as the term "comprising" is open ended. Also, as used herein, the terms "computer readable" and "machine readable" are considered equivalent unless indicated otherwise.

Figure 8:
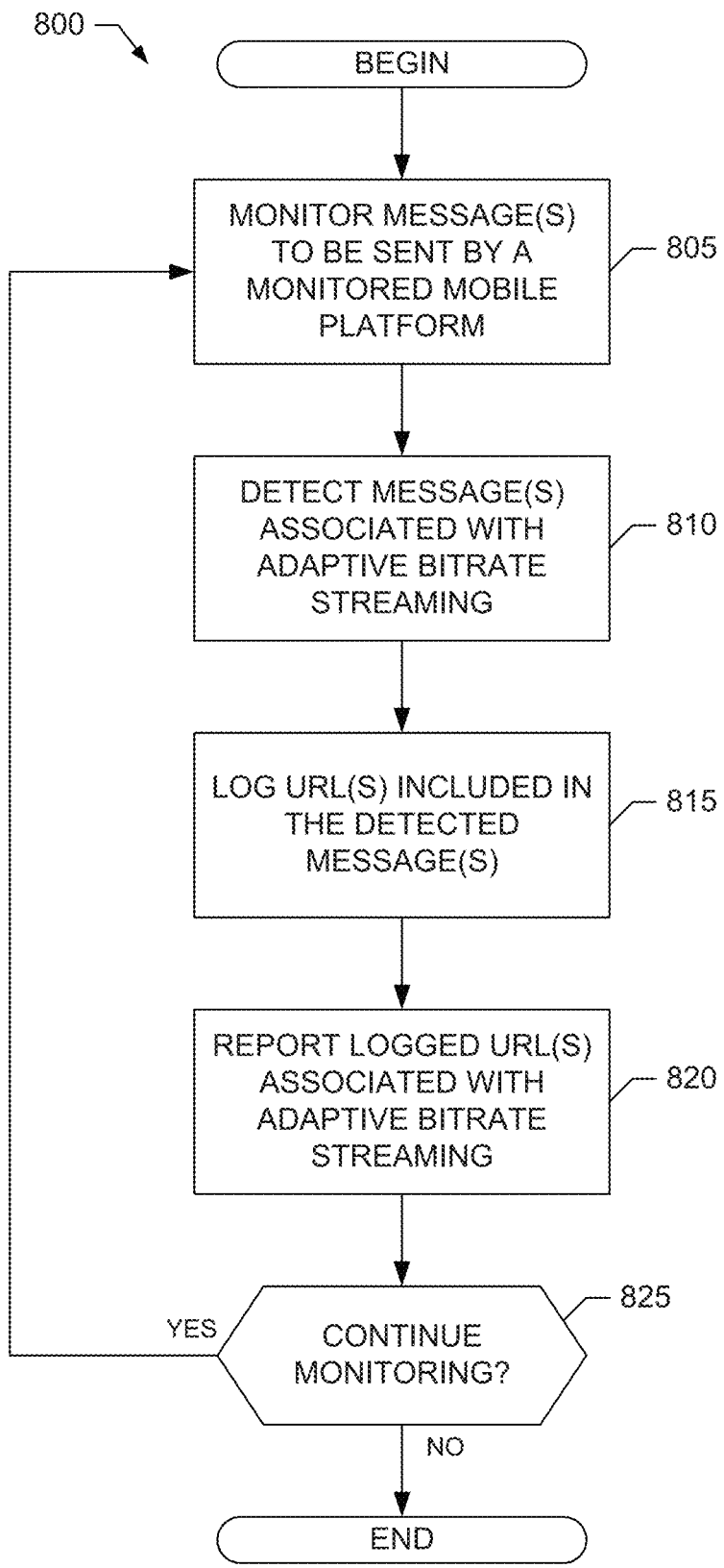
FIG. 8 is a flowchart representative of example machine readable instructions that may be executed to implement the example meter of FIG. 4.

An example program 800 including example machine readable instructions that may be executed to implement the example meter 125 of FIGS. 1, 2A-C and/or 4 is represented by the flowchart shown in FIG. 8. For convenience and without loss of generality, execution of the example program 800 is described in the context of the example meter 125 of FIG. 4 monitoring the example mobile platform 105 in the example environment of use 100 of FIGS. 1 and 2A-C. With reference to the preceding figures and associated written descriptions, the example program 800 of FIG. 8 begins execution at block 805 at which the example message detector 405 of the meter 125 monitors messages, such as HTTP messages, originated by and to be sent from the mobile platform 105, as described above. At block 810, the message detector 405 detects, as described above, one or more messages associated with adaptive bitrate streaming, such as HTTP GET messages including adaptive bitrate streaming URLs. At block 815, the example URL reporter 410 included in the meter 125 logs, as described above, the adaptive bitrate streaming URL(s) included in the message(s) detected at block 810. At block 820, the URL reporter 410 reports the adaptive bitrate streaming URL(s) logged at block 815 to an AME server, such as the AME server 130. If monitoring of the mobile platform 105 is to continue (block 825), the processing at block 805-820 repeats. Otherwise, execution of the example program 800 ends.

Figure 9:
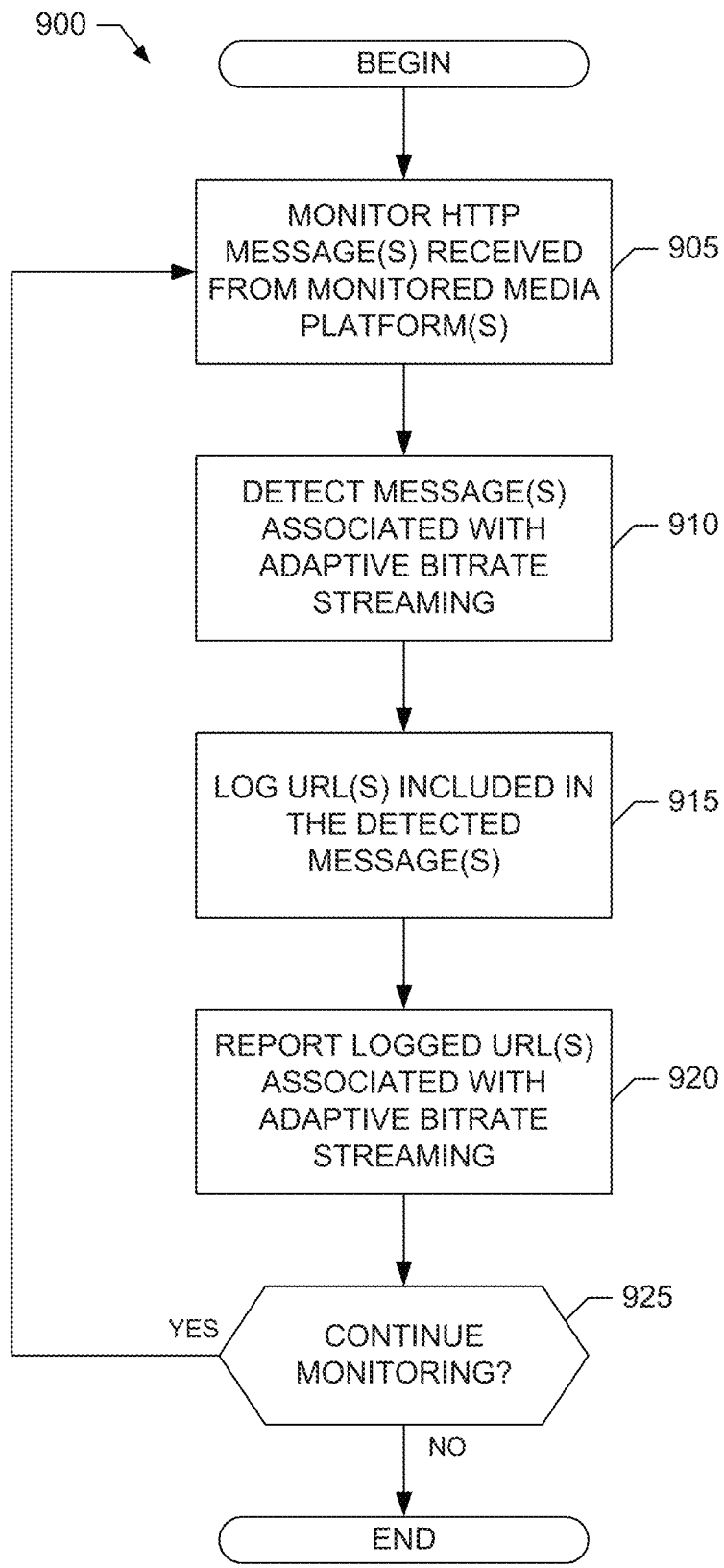
FIG. 9 is a flowchart representative of example machine readable instructions that may be executed to implement the example proxy server of FIG. 5.

An example program 900 including example machine readable instructions that may be executed to implement the example proxy server 325 of FIGS. 3 and/or 5 is represented by the flowchart shown in FIG. 9. For convenience and without loss of generality, execution of the example program 900 is described in the context of the example proxy server 325 of FIG. 5 operating in the example environment of use 300 of FIG. 3. With reference to the preceding figures and associated written descriptions, the example program 900 of FIG. 9 begins execution at block 905 at which the example message detector 505 of the proxy server 325 monitors messages, such as HTTP messages, received from mobile platforms, such as the mobile platform 105, as described above. At block 910, the message detector 505 detects, as described above, one or more messages associated with adaptive bitrate streaming, such as HTTP GET messages including adaptive bitrate streaming URLs. At block 915, the example URL reporter 510 included in the proxy server 325 logs, as described above, the adaptive bitrate streaming URL(s) included in the message(s) detected at block 910. At block 920, the URL reporter 510 reports the adaptive bitrate streaming URL(s) logged at block 915 to an AME server, such as the AME server 130. If monitoring of messages is to continue (block 925), the processing at block 905-920 repeats. Otherwise, execution of the example program 900 ends.

Figure 10:
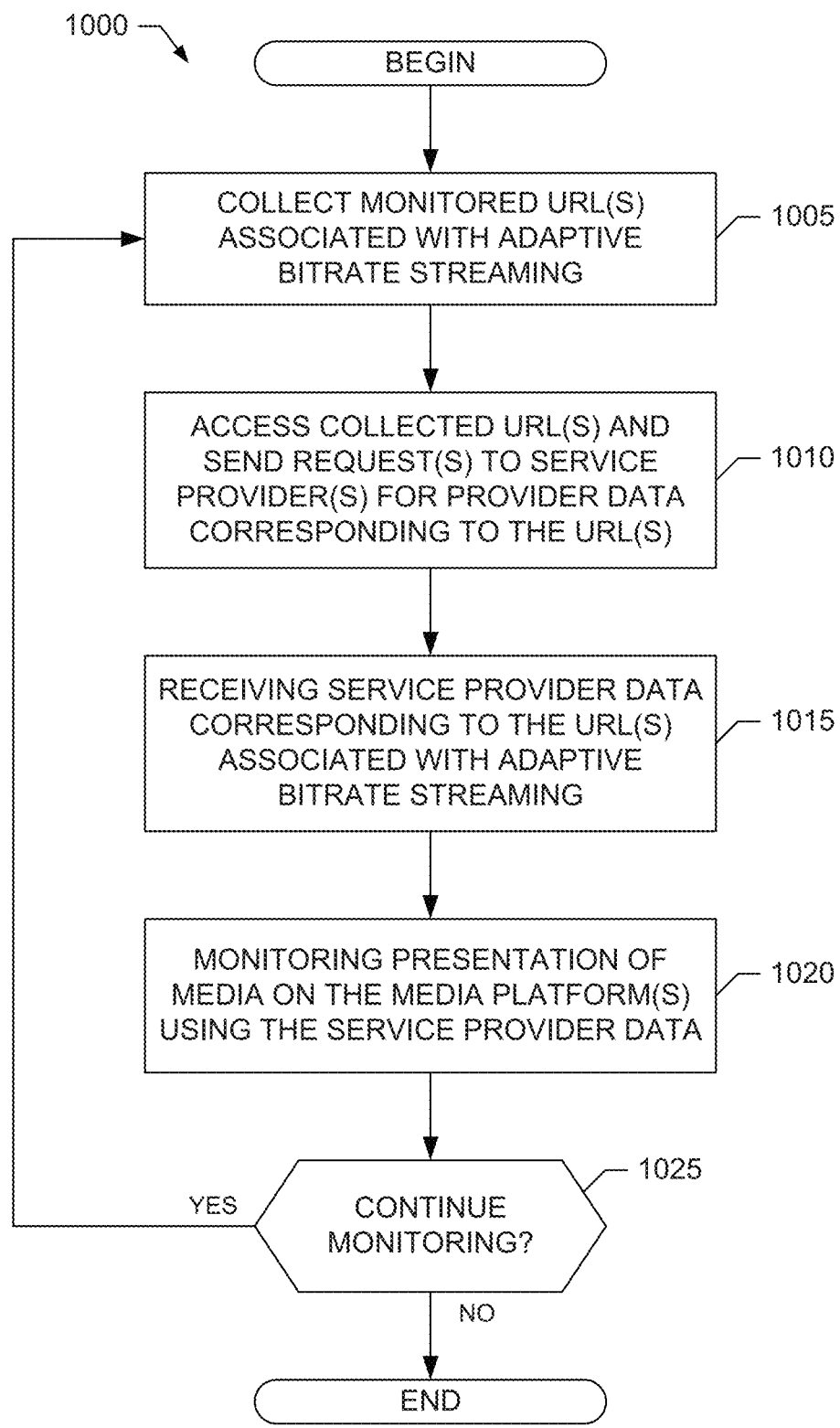
FIG. 10 is a flowchart representative of example machine readable instructions that may be executed to implement the example audience measurement entity server of FIG. 6.

An example program 1000 including example machine readable instructions that may be executed to implement the example AME server 130 of FIGS. 1-3 and/or 6 is represented by the flowchart shown in FIG. 10. For convenience and without loss of generality, execution of the example program 1000 is described in the context of the example AME server 130 of FIG. 6 operating in the example environments of use 100 and/or 300 of FIGS. 1-3. With reference to the preceding figures and associated written descriptions, the example program 1000 of FIG. 10 begins execution at block 1005 at which the example URL collector 605 of the AME server 130 collects, as described above, monitored adaptive bitrate streaming URLs reported by meter(s), such as the example meter 125, and/or proxy server(s), such as the example proxy server 325, operating in the example environments of use 100 and/or 300. At block 1010, the URL collector 605 accesses one or more collected adaptive bitrate streaming URLs and provides the URL(s) to the example provider data requestor 610 of the AME server 130, which includes the adaptive bitrate streaming URL(s), or contents thereof, in one or more requests for provider information sent to a service provider's OSS, such as the example OSS 135, as described above. At block 1015, the provider data requestor 610 receives one or more responses from the service provider's OSS, such as the example OSS 135, including provider data, such as network log information, subscriber demographic data, etc., corresponding to the adaptive bitrate streaming URL(s) that was(were) the subject of the request(s) sent at block 1010. At block 1020, the example ratings monitor 620 of the AME server 130 determines ratings data, as described above, to monitor presentation of media (e.g., media impressions) on mobile platform(s), such as the mobile platform 105, in the environments of use 100 and/or 300 using the provider data received at block 1015. For example, and as described in further detail above, the ratings monitor 620 may combine the provider data received at block 1015 with media identification data determined by the example media identifier 615 included in the AME server 130 to determine the ratings data at block 1020. If monitoring is to continue (block 1025), the processing at block 1005-1020 repeats. Otherwise, execution of the example program 1000 ends.

Figure 11:
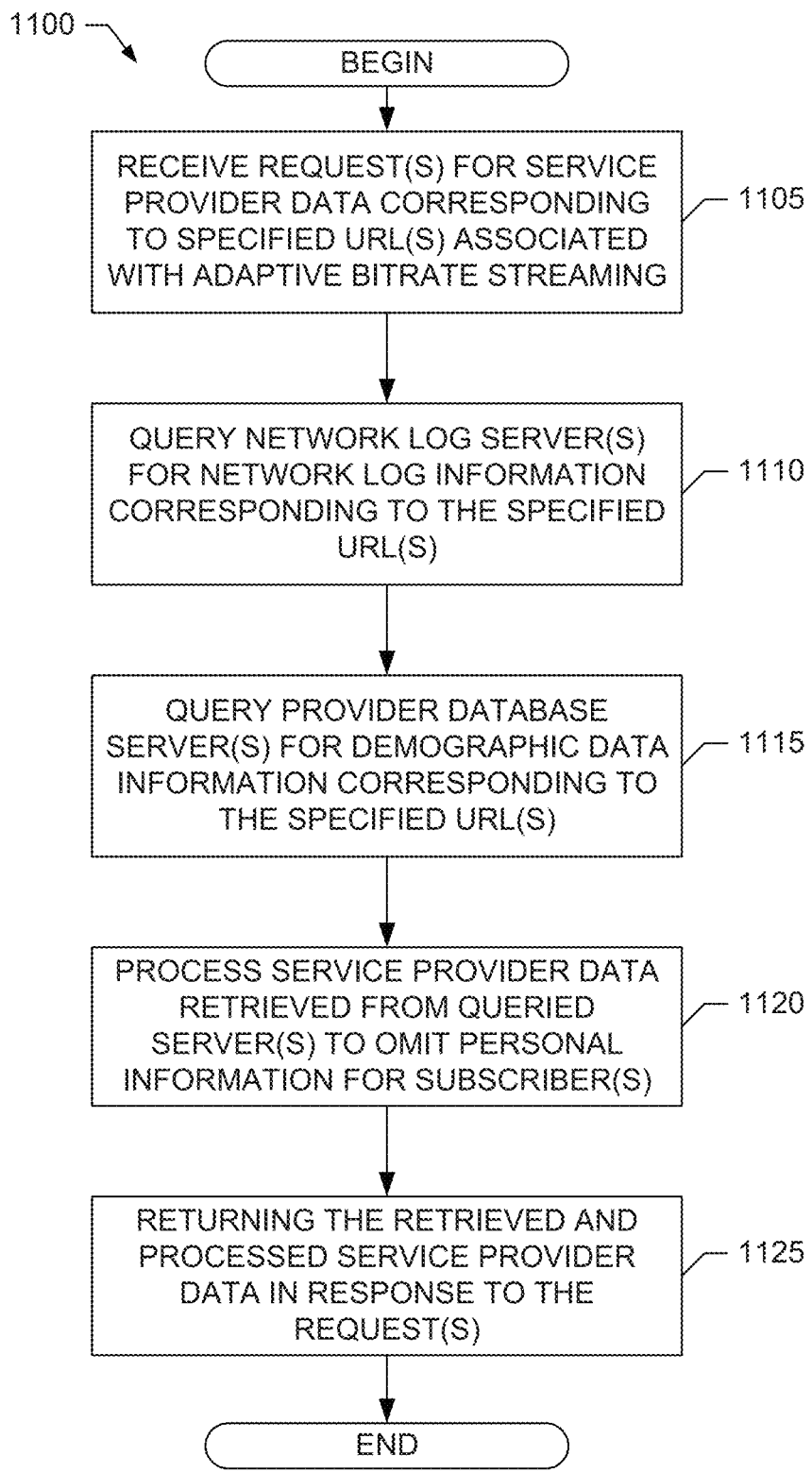
FIG. 11 is a flowchart representative of example machine readable instructions that may be executed to implement the example operations support system of FIG. 7.

An example program 1100 including example machine readable instructions that may be executed to implement the example OSS 135 of FIGS. 1-3 and/or 7 is represented by the flowchart shown in FIG. 11. For convenience and without loss of generality, execution of the example program 1100 is described in the context of the example OSS 135 of FIG. 7 operating in the example environments of use 100 and/or 300 of FIGS. 1-3. With reference to the preceding figures and associated written descriptions, the example program 1100 of FIG. 11 begins execution at block 1105 at which the example AME request interface 705 of the OSS 135 receives one or more requests from an AME server, such as the AME server 130, for service provider data corresponding to adaptive bitrate streaming URL(s) specified in the requests, as described above. At block 1110, the example server querier 710 of the OSS 135 queries, as described above, the example network log server 140 of the OSS 135 for network information corresponding to the adaptive bitrate streaming URL(s) specified in the request(s) received at block 1105. At block 1115, the server querier 710 queries, as described above, the example subscriber database server 145 of the OSS 135 for subscriber demographic data corresponding to the adaptive bitrate streaming URL(s) specified in the request(s) received at block 1105. As described above, the request(s) received at block 1105 may include time(s) and/or time range(s) associated with the specified adaptive bitrate streaming URL(s), which may be used to focus the queries of the network log server 140 and/or the subscriber database server 145. At block 1120, the example provider data reporter 715 of the processes the network log information retrieved at block 1110 and/or the subscriber demographic data retrieved at block 1115 to omit personal information and thereby protect the privacy of the service provider's customers/subscribers. At block 1125, the provider data reporter 715 returns the resulting service provider information determined at block 1120 to the requesting AME server in one or more responses sent via the AME request interface 705. Execution of the example program 1100 then ends.

Figure 12:
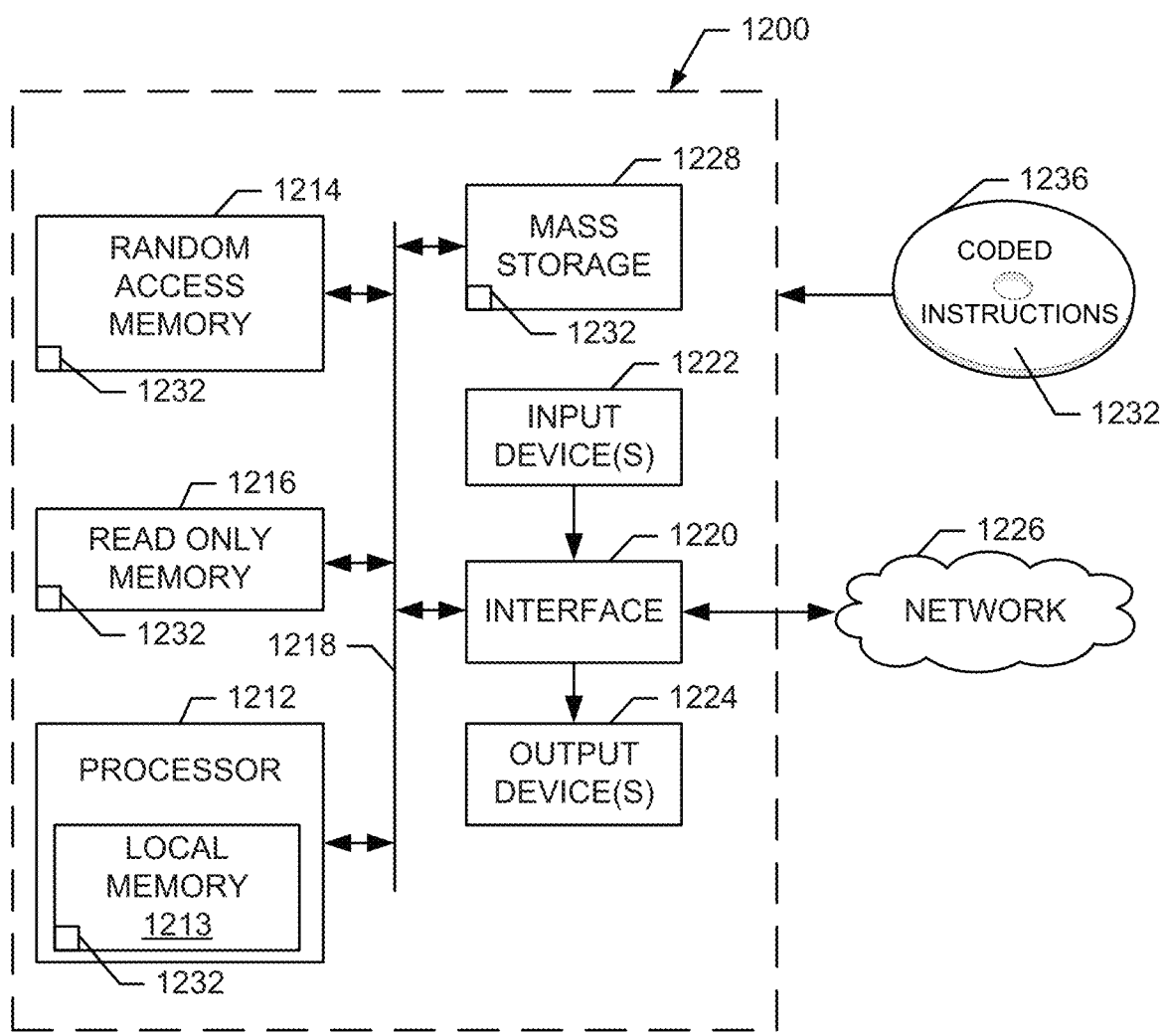
FIG. 12 is a block diagram of an example processor platform that may execute the example machine readable instructions of FIGS. 8-10 and/or 11 to implement the example meter of FIG. 4, the example proxy server of FIG. 5, the example audience measurement entity server of FIG. 6, the example operations support system of FIG. 7 and/or the example systems of FIGS. 1 and/or 3.

FIG. 12 is a block diagram of an example processor platform 1200 capable of executing the instructions of FIGS. 8-11 to implement the system 102, the example system 302, the example mobile platform 105, the example access network 110, the Internet 115, the example streaming media server 120, the example meter 125, the example AME server 130, the example OSS 135, the example network log server 140, the example subscriber database server 145, the example proxy server 325, the example message detector 405, the example URL reporter 410, the example message detector 505, the example URL reporter 510, the example URL collector 605, the example provider data requestor 610, the example media identifier 615, the example ratings monitor 620, the example AME request interface 705, the example server querier 710 and/or the example provider data reporter 715 of FIGS. 1-7. The processor platform 1200 can be, for example, a server, a personal computer, a mobile device (e.g., a cell phone, a smart phone, a tablet such as an iPad™), a personal digital assistant (PDA), an Internet appliance, a DVD player, a CD player, a digital video recorder, a Blu-ray player, a gaming console, a personal video recorder, a set top box a digital camera, or any other type of computing device.

The processor platform 1200 of the illustrated example includes a processor 1212. The processor 1212 of the illustrated example is hardware. For example, the processor 1212 can be implemented by one or more integrated circuits, logic circuits, microprocessors or controllers from any desired family or manufacturer.

The processor 1212 of the illustrated example includes a local memory 1213 (e.g., a cache). The processor 1212 of the illustrated example is in communication with a main memory including a volatile memory 1214 and a non-volatile memory 1216 via a link 1218. The link 1218 may be implemented by a bus, one or more point-to-point connections, etc., or a combination thereof. The volatile memory 1214 may be implemented by Synchronous Dynamic Random Access Memory (SDRAM), Dynamic Random Access Memory (DRAM), RAMBUS Dynamic Random Access Memory (RDRAM) and/or any other type of random access memory device. The non-volatile memory 1216 may be implemented by flash memory and/or any other desired type of memory device. Access to the main memory 1214, 1216 is controlled by a memory controller.

The processor platform 1200 of the illustrated example also includes an interface circuit 1220. The interface circuit 1220 may be implemented by any type of interface standard, such as an Ethernet interface, a universal serial bus (USB), and/or a PCI express interface.

In the illustrated example, one or more input devices 1222 are connected to the interface circuit 1220. The input device(s) 1222 permit(s) a user to enter data and commands into the processor 1212. The input device(s) can be implemented by, for example, an audio sensor, a microphone, a camera (still or video), a keyboard, a button, a mouse, a touchscreen, a track-pad, a trackball, a trackbar (such as an isopoint), a voice recognition system and/or any other human-machine interface. Also, many systems, such as the processor platform 1200, can allow the user to control the computer system and provide data to the computer using physical gestures, such as, but not limited to, hand or body movements, facial expressions, and face recognition One or more output devices 1224 are also connected to the interface circuit 1220 of the illustrated example. The output devices 1224 can be implemented, for example, by display devices (e.g., a light emitting diode (LED), an organic light emitting diode (OLED), a liquid crystal display, a cathode ray tube display (CRT), a touchscreen, a tactile output device, a printer and/or speakers). The interface circuit 1220 of the illustrated example, thus, typically includes a graphics driver card, a graphics driver chip or a graphics driver processor.

The interface circuit 1220 of the illustrated example also includes a communication device such as a transmitter, a receiver, a transceiver, a modem and/or network interface card to facilitate exchange of data with external machines (e.g., computing devices of any kind) via a network 1226 (e.g., an Ethernet connection, a digital subscriber line (DSL), a telephone line, coaxial cable, a cellular telephone system, etc.).

The processor platform 1200 of the illustrated example also includes one or more mass storage devices 1228 for storing software and/or data. Examples of such mass storage devices 1228 include floppy disk drives, hard drive disks, compact disk drives, Blu-ray disk drives, RAID (redundant array of independent disks) systems, and digital versatile disk (DVD) drives.

Coded instructions 1232 corresponding to the instructions of FIGS. 8-11 may be stored in the mass storage device 1228, in the volatile memory 1214, in the non-volatile memory 1216, in the local memory 1213 and/or on a removable tangible computer readable storage medium, such as a CD or DVD 1236.

Although certain example methods, apparatus and articles of manufacture have been disclosed herein, the scope of coverage of this patent is not limited thereto. On the contrary, this patent covers all methods, apparatus and articles of manufacture fairly falling within the scope of the claims of this patent.

What is claimed is:

1. A media monitoring apparatus comprising:
means for accessing, at a first server, a first adaptive bitrate streaming URL collected by a meter executing on a mobile platform, the first adaptive bitrate streaming URL collected from a first message to be sent by the mobile platform to a second server to stream first media according to an adaptive bitrate streaming protocol, the first adaptive bitrate streaming URL received at the first server in a report sent from the meter executing on the mobile platform, the first server different from the second server to which the mobile platform is to send the first message including the first adaptive bitrate streaming URL to stream the first media;
means for requesting network log information corresponding to the first adaptive bitrate streaming URL from a service provider providing network access for the mobile platform; and
means for monitoring presentation of the first media on the mobile platform using the network log information.

2. The apparatus of claim 1, wherein the network log information includes at least one of a timestamp corresponding to when the first message including the first adaptive bitrate streaming URL was logged by the service provider, or location information specifying a location of the mobile platform at a time when the first message including the first adaptive bitrate streaming URL was logged by the service provider.

3. The apparatus of claim 1, wherein the means for requesting is to obtain demographic information, in addition to the network log information, in response to providing the first adaptive bitrate streaming URL to the service provider.

4. The apparatus of claim 3, wherein the network log information and the demographic information omit personal information related to a subscriber associated with the mobile platform.

5. The apparatus of claim 1, wherein to request the network log information, the means for requesting is to send, to the service provider, a request including the first adaptive bitrate streaming URL and a time range associated with when the first adaptive bitrate streaming URL was detected.

6. The apparatus of claim 1, wherein to monitor the presentation of the first media on the mobile platform, the means for monitoring is to combine the network log information with media identification information associated with the first adaptive bitrate streaming URL.

7. The apparatus of claim 1, wherein:
the means for requesting is to request, from the service provider, network log information corresponding to other adaptive bitrate streaming URLs included in subsequent messages originated by the mobile platform to stream the first media according to the adaptive bitrate streaming protocol; and
the means for monitoring is to determine ratings data associated with the presentation of the first media on the mobile platform using the network log information corresponding to the first adaptive bitrate streaming URL and the network log information corresponding to the other adaptive bitrate streaming URLs, the ratings data to have a time granularity corresponding to time intervals between media segments of the first media identified by the first message and the subsequent messages.

8. The apparatus of claim 1, wherein the adaptive bitrate streaming protocol corresponds to at least one of hypertext transfer protocol (HTTP) live streaming (HLS), dynamic adaptive streaming over HTTP (DASH), or smooth streaming.

9. A media monitoring apparatus comprising:
memory including computer readable instructions; and
a processor to execute the computer readable instructions to at least:
access, at a first server, a first adaptive bitrate streaming URL collected by a meter executing on a mobile platform, the first adaptive bitrate streaming URL collected from a first message to be sent by the mobile platform to a second server to stream first media according to an adaptive bitrate streaming protocol, the first adaptive bitrate streaming URL received at the first server in a report sent from the meter executing on the mobile platform, the first server different from the second server to which the mobile platform is to send the first message including the first adaptive bitrate streaming URL to stream the first media;
request network log information corresponding to the first adaptive bitrate streaming URL from a service provider providing network access for the mobile platform; and
monitor presentation of the first media on the mobile platform using the network log information.

10. The apparatus of claim 9, wherein the network log information includes at least one of a timestamp corresponding to when the first message including the first adaptive bitrate streaming URL was logged by the service provider, or location information specifying a location of the mobile platform at a time when the first message including the first adaptive bitrate streaming URL was logged by the service provider.

11. The apparatus of claim 9, wherein to request the network log information, the processor is to send, to the service provider, a request including the first adaptive bitrate streaming URL and a time range associated with when the first adaptive bitrate streaming URL was detected.

12. The apparatus of claim 9, wherein the processor is to:
request, from the service provider, network log information corresponding to other adaptive bitrate streaming URLs included in subsequent messages originated by the mobile platform to stream the first media according to the adaptive bitrate streaming protocol; and
determine ratings data associated with the presentation of the first media on the mobile platform using the network log information corresponding to the first adaptive bitrate streaming URL and the network log information corresponding to the other adaptive bitrate streaming URLs, the ratings data to have a time granularity corresponding to time intervals between media segments of the first media identified by the first message and the subsequent messages.

13. A media monitoring apparatus comprising:
means for querying a service provider that is to provide network access for a mobile platform, the means for querying to:
access a request from a first server of an audience measurement entity (AME), the request for network log information corresponding to a first adaptive bitrate streaming uniform resource locator (URL) included in a first message sent by the mobile platform to a second server to request delivery of first streaming media according to an adaptive bitrate streaming protocol; and
query a third server of the service provider to retrieve the network log information corresponding to the first adaptive bitrate streaming URL from the third server; and
means for reporting the network log information to the first server of the AME in response to the request.

14. The apparatus of claim 13, wherein the network log information includes at least one of a timestamp corresponding to when the first message including the first adaptive bitrate streaming URL was logged by the service provider, or location information specifying a location of the mobile platform at a time when the first message including the first adaptive bitrate streaming URL was logged by the service provider.

15. The apparatus of claim 13, wherein the means for reporting is further to omit personal information related to a subscriber associated with the mobile platform from the network log information before returning the network log information to the first server of the AME.

16. The apparatus of claim 13, wherein the request includes the first adaptive bitrate streaming URL and a time range associated with when the first adaptive bitrate streaming URL was detected by a meter on the mobile platform, the meter to report the first adaptive bitrate streaming URL to the first server of the AME.

17. The apparatus of claim 16, wherein the means for querying is to:
query the third server using the first adaptive bitrate streaming URL and the time range;
obtain, in response to the query, a timestamp corresponding to when the first message including the first adaptive bitrate streaming URL was logged by the service provider; and
obtain, in response to the query, location information specifying a location of the mobile platform at a time when the first message including the first adaptive bitrate streaming URL was logged by the network.

18. The apparatus of claim 13, wherein:
the means for querying is to query a database to obtain demographic information, in addition to the network log information, corresponding to the first adaptive bitrate streaming URL; and
the means for reporting is to forward the demographic information, in addition to the network log information, to the first server of the AME.

19. The apparatus of claim 18, wherein the means for reporting is to omit personal information related to a subscriber associated with the mobile platform from the demographic information before forwarding the demographic information to the first server of the AME.

20. The apparatus of claim 13, wherein the adaptive bitrate streaming protocol corresponds to at least one of hypertext transfer protocol (HTTP) live streaming (HLS), dynamic adaptive streaming over HTTP (DASH), or smooth streaming.

* * * * *